United States Patent
Alexander et al.

(10) Patent No.: US 11,541,795 B2
(45) Date of Patent: Jan. 3, 2023

(54) RECONFIGURABLE SEATING AND CARGO SYSTEMS WITH INFLATABLE PANELS

(71) Applicant: GM GLOBAL TECHNOLOGY OPERATIONS LLC, Detroit, MI (US)

(72) Inventors: Paul W. Alexander, Ypsilanti, MI (US); Louis D. Thole, Grosse Pointe Park, MI (US); Conner J. Stormer, Detroit, MI (US); Daniel W. Booth, Bloomfield Township, MI (US); Wonhee M. Kim, Royal Oak, MI (US); David Acosta, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 17/084,796

(22) Filed: Oct. 30, 2020

(65) Prior Publication Data

US 2022/0134927 A1    May 5, 2022

(51) Int. Cl.
*B60N 2/90* (2018.01)
*A47C 27/08* (2006.01)
*B60R 11/00* (2006.01)

(52) U.S. Cl.
CPC ............ *B60N 2/914* (2018.02); *A47C 27/082* (2013.01); *B60R 11/00* (2013.01); *B60R 2011/008* (2013.01); *B60R 2011/0075* (2013.01)

(58) Field of Classification Search
None
See application file for complete search history.

(56) References Cited

U.S. PATENT DOCUMENTS

| | | | | |
|---|---|---|---|---|
| 3,428,974 A | * | 2/1969 | Stuart | A47C 27/081 5/710 |
| 4,982,466 A | * | 1/1991 | Higgins | A47C 27/082 5/713 |
| 5,421,044 A | * | 6/1995 | Steensen | A47C 27/082 5/713 |
| 5,556,169 A | * | 9/1996 | Parrish | B60N 2/803 5/655.4 |
| 5,598,593 A | * | 2/1997 | Wolfe | A47C 27/087 5/710 |

(Continued)

OTHER PUBLICATIONS

U.S. Appl. No. 16/564,777, filed Sep. 9, 2019, Alexander et al.

(Continued)

*Primary Examiner* — David R Dunn
*Assistant Examiner* — Christopher E Veraa

(57) ABSTRACT

An inflatable system includes a first bladder configured to contain gas and a second bladder configured to contain gas. The first bladder includes a top wall, a bottom wall opposite of the top wall, a sidewall extending between and connected to perimeter edges of the top and bottom walls, and a plurality of tethers extending between and connected to interior surfaces of the top and bottom walls. The second bladder includes a top wall, a bottom wall opposite of its top wall, a sidewall extending between and connected to perimeter edges of its top and bottom walls, and a plurality of tethers extending between and connected to interior surfaces of its top and bottom walls. The bottom wall of the first bladder is secured to the top wall of the second bladder.

9 Claims, 17 Drawing Sheets

(56) References Cited

U.S. PATENT DOCUMENTS

| | | | | |
|---|---|---|---|---|
| 6,092,249 | A * | 7/2000 | Kamen | A47C 7/029 297/284.3 |
| 6,163,909 | A * | 12/2000 | Lin | A47C 27/10 5/713 |
| 7,254,853 | B1 * | 8/2007 | Kim | A47C 27/087 5/710 |
| 7,509,699 | B1 * | 3/2009 | Tresenfeld | A47C 27/10 5/413 AM |
| 10,687,634 | B1 | 6/2020 | Kim et al. | |
| 2003/0030319 | A1 * | 2/2003 | Clapper | A47C 4/54 297/452.41 |
| 2006/0278628 | A1 * | 12/2006 | Foggett | A47C 27/081 219/217 |
| 2007/0169273 | A1 * | 7/2007 | Wu | A47C 27/081 5/710 |
| 2007/0199153 | A1 * | 8/2007 | Wu | A47C 19/005 5/723 |
| 2008/0277985 | A1 * | 11/2008 | Petzel | B60N 2/914 297/284.6 |
| 2013/0133138 | A1 * | 5/2013 | Sugano | B32B 37/24 5/652 |
| 2013/0225018 | A1 * | 8/2013 | Peterson | B63B 35/36 441/40 |
| 2015/0052685 | A1 * | 2/2015 | Bhat | A61G 7/05769 5/644 |
| 2017/0000685 | A1 * | 1/2017 | Rohr | A47C 21/006 |
| 2017/0106830 | A1 * | 4/2017 | Rohn | B60R 21/232 |
| 2018/0256383 | A1 * | 9/2018 | Booth | A61G 7/05769 |
| 2018/0311089 | A1 * | 11/2018 | Sachdev | A61G 7/05769 |
| 2019/0195427 | A1 * | 6/2019 | Alexander | B32B 7/12 |
| 2020/0113342 | A1 * | 4/2020 | Stone | A47C 27/10 |

OTHER PUBLICATIONS

U.S. Appl. No. 16/566,374, filed Sep. 10, 2019, Han et al.
U.S. Appl. No. 16/576,376, filed Sep. 19, 2019, Yen et al.
U.S. Appl. No. 16/709,880, filed Dec. 10, 2019, Alexander et al.

* cited by examiner

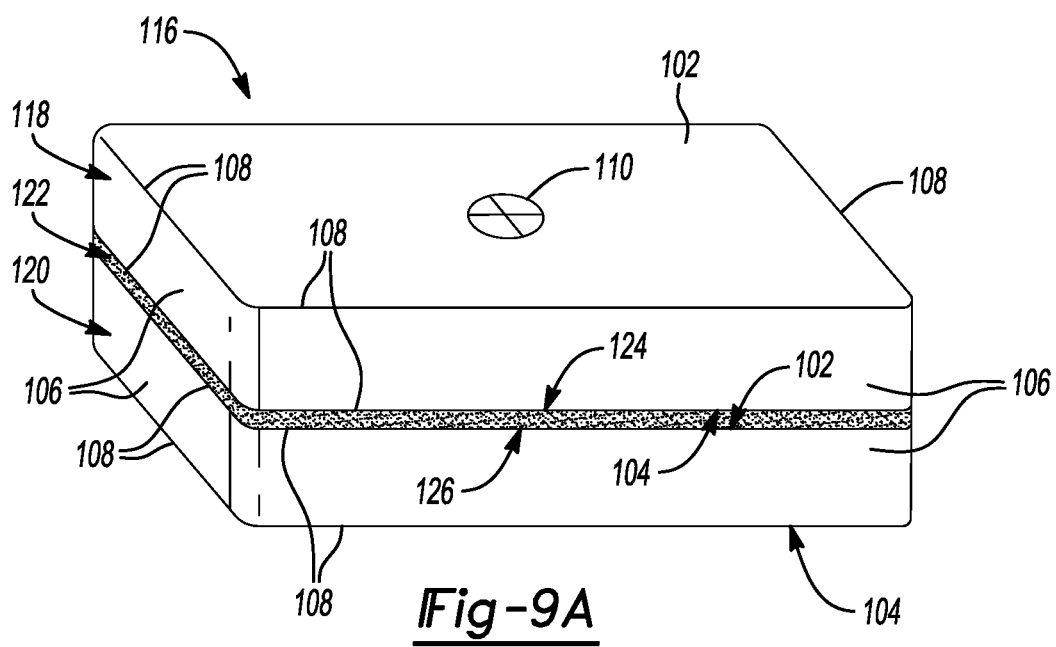
Fig-9A
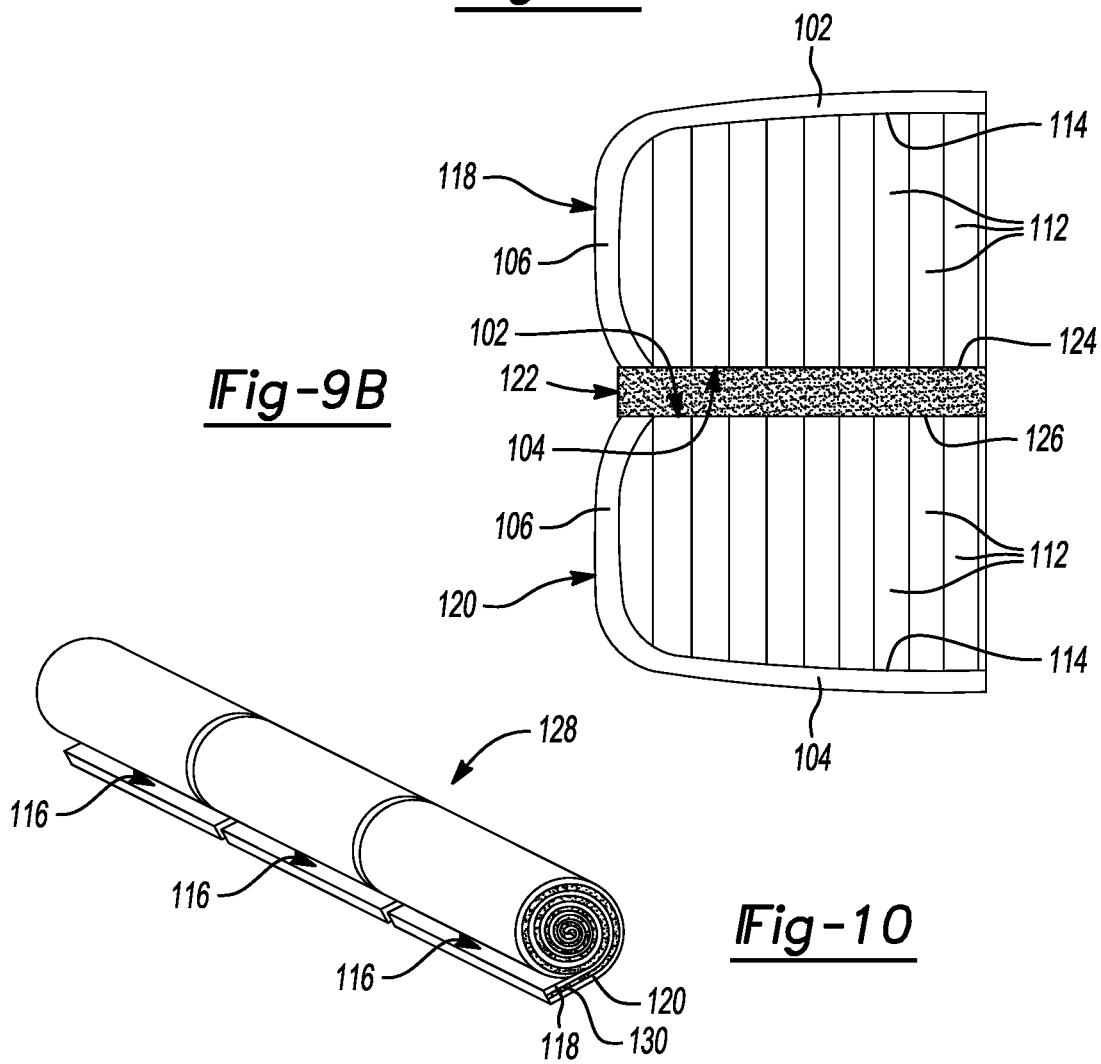
Fig-9B
Fig-10

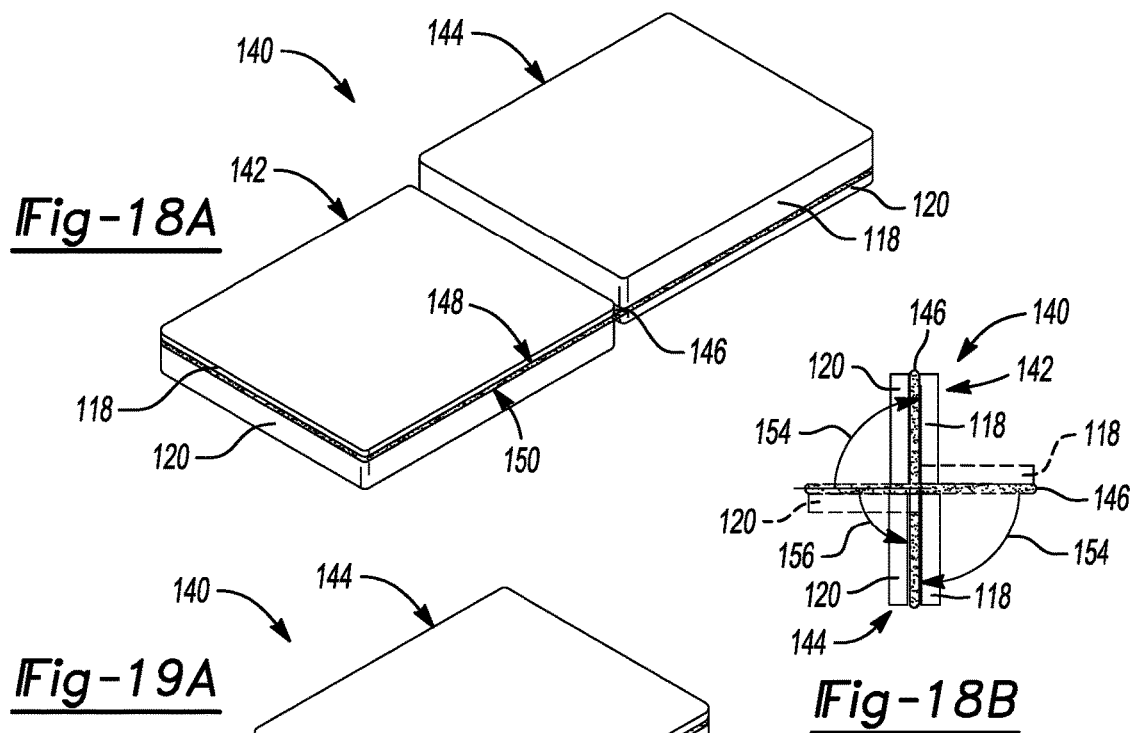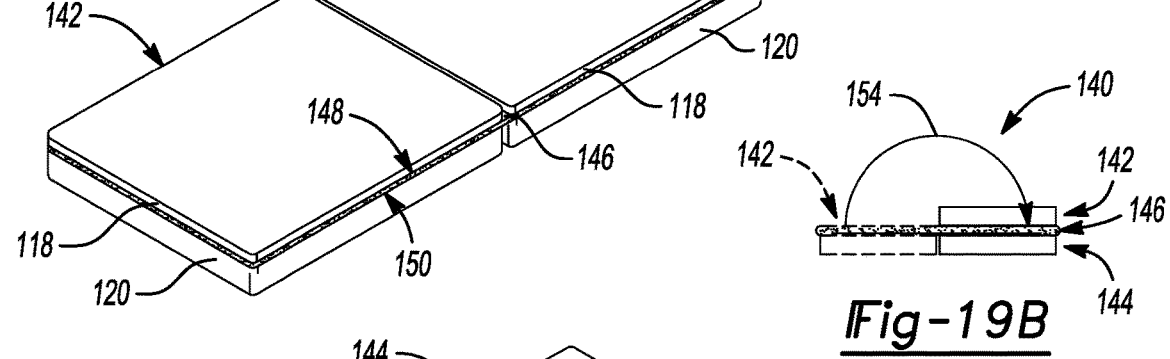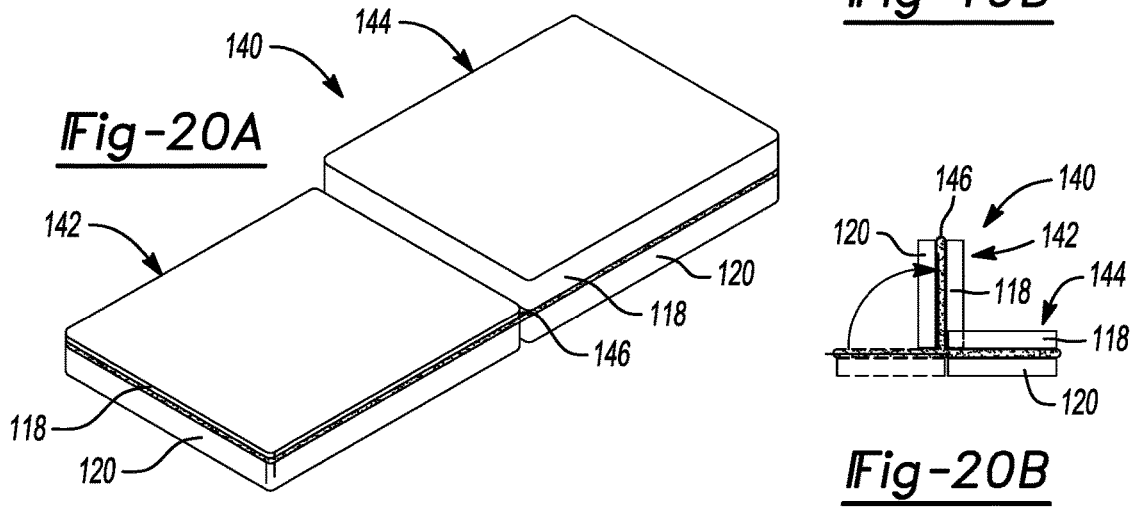

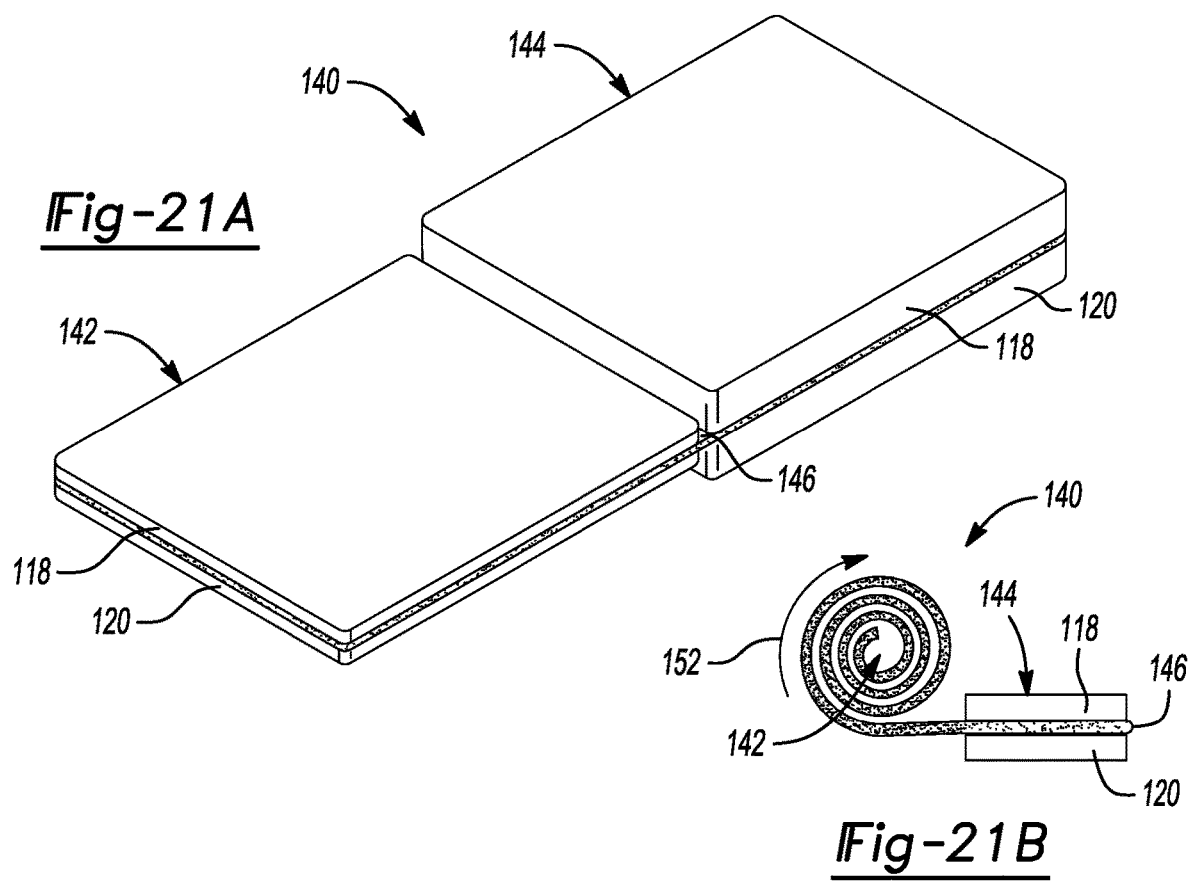
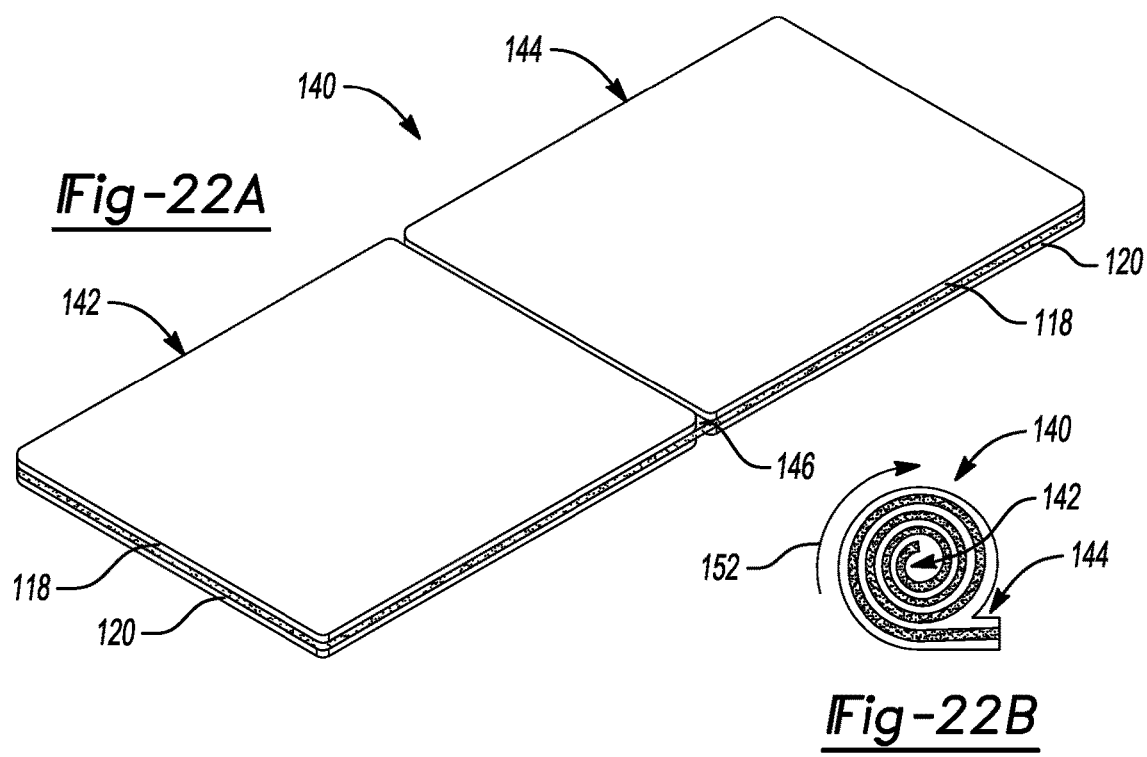

RECONFIGURABLE SEATING AND CARGO SYSTEMS WITH INFLATABLE PANELS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to reconfigurable seating and cargo systems with inflatable panels.

Some vehicles includes seating and cargo systems that can be adjusted from one configuration to another configuration. For example, some vehicles include seats that can be adjusted from an upright position to a reclined position. In another example, some vehicles include seats that can be collapsed and stored below a floor of a passenger cabin. In yet another example, some vehicles include a cargo area floor that can be raised or lowered to adjust the height of a cargo area.

SUMMARY

An example of an inflatable system according to the present disclosure includes a first bladder configured to contain gas and a second bladder configured to contain gas. The first bladder includes a top wall, a bottom wall opposite of the top wall, a sidewall extending between and connected to perimeter edges of the top and bottom walls, and a plurality of tethers extending between and connected to interior surfaces of the top and bottom walls. The second bladder includes a top wall, a bottom wall opposite of its top wall, a sidewall extending between and connected to perimeter edges of its top and bottom walls, and a plurality of tethers extending between and connected to interior surfaces of its top and bottom walls. The bottom wall of the first bladder is secured to the top wall of the second bladder.

In one example, the first bladder is inflatable and deflatable independent of inflation and deflation of the second bladder, and the second bladder is inflatable and deflatable independent of inflation and deflation of the first bladder.

In one example, the inflatable system further includes a membrane disposed between the first and second bladders. The bottom wall of the first bladder is one of attached to and formed by a top surface of the membrane, and the top wall of the second bladder is one of attached to and formed by a bottom surface of the membrane such that the bottom wall of the first bladder is secured to the top wall of the second bladder through the membrane.

In one example, the inflatable system further includes a third bladder configured to contain gas. The third bladder includes a top wall, a bottom wall opposite of its top wall, a sidewall extending between and connected to perimeter edges of its top and bottom walls, and a plurality of tethers extending between and connected to interior surfaces of its top and bottom walls. Either the top wall of the third bladder is one of attached to and formed by the bottom surface of the membrane, or the bottom wall of the third bladder is one of attached to and formed by the top surface of the membrane.

In one example, the bottom wall of the third bladder is one of attached to and formed by the top surface of the membrane and, when the first and third bladders are inflated, the sidewall of the third bladder abuts the sidewall of the first bladder.

In one example, the top wall of the third bladder is one of attached to and formed by the bottom surface of the membrane and, when the second and third bladders are inflated, the sidewall of the third bladder abuts the sidewall of the second bladder.

In one example, the inflatable system is reconfigurable by at least one of inflating the third bladder, deflating the third bladder, and adjusting the tension of the tethers in at least one of the first, second, and third bladders.

In one example, the inflatable system further includes a fourth bladder configured to contain gas. The fourth bladder includes a top wall, a bottom wall opposite of its top wall, a sidewall extending between and connected to perimeter edges of its top and bottom walls, and a plurality of tethers extending between and connected to interior surfaces of its top and bottom walls. The bottom wall of the third bladder is one of attached to and formed by the top surface of the membrane. The top wall of the fourth bladder is one of attached to and formed by the bottom surface of the membrane. When the first and third bladders are inflated, the sidewall of the third bladder abuts the sidewall of the first bladder at a first location along a length of the membrane. When the second and fourth bladders are inflated, the sidewall of the fourth bladder abuts the sidewall of the second bladder at a second location along the length of the membrane.

In one example, the second location is the same as the first location, and an interface between the abutting sidewalls of the first and third bladders is disposed above an interface between the abutting sidewalls of the second and fourth bladders.

In one example, the second location is different than the first location, and the third bladder is disposed above an interface between the abutting sidewalls of the second and fourth bladders.

In one example, the first, second, third, and fourth bladders are configured to form at least a portion of a vehicle seat cushion, and the inflatable system further includes a panel control module configured to deflate the third bladder such that the second and fourth bladders fold toward one another and around an occupant on the vehicle seat cushion under a weight of the occupant.

Another example of an inflatable system according to the present disclosure includes a first bladder configured to contain gas and a second bladder configured to contain gas. The first bladder includes a top wall, a bottom wall opposite of the top wall, a sidewall extending between and connected to perimeter edges of the top and bottom walls, and a plurality of tethers extending between and connected to interior surfaces of the top and bottom walls. The second bladder includes a top wall, a bottom wall opposite of its top wall, a sidewall extending between and connected to perimeter edges of its top and bottom walls, and a plurality of tethers extending between and connected to interior surfaces of its top and bottom walls. The second bladder is releasably attached to the first bladder.

In one example, the inflatable system further includes at least one releasable attachment mechanism that releasably attaches the second bladder to the first bladder.

In one example, when the first and second bladders are inflated, the sidewall of the second bladder abuts the sidewall of the first bladder, and the at least one releasable attachment mechanism includes a first releasable attachment mechanism that releasably attaches the one sidewall of the second bladder to the one sidewall of the first bladder.

In one example, the inflatable system further includes a third bladder configured to contain gas. The third bladder includes a top wall, a bottom wall opposite of its top wall, a sidewall extending between and connected to perimeter edges of its top and bottom walls, and a plurality of tethers extending between and connected to interior surfaces of its top and bottom walls. Either the bottom wall of the first bladder is secured to the top wall of the third bladder, or the top wall of the first bladder is secured to the bottom wall of the third bladder.

In one example, the inflatable system further includes a fourth bladder configured to contain gas. The fourth bladder includes a top wall, a bottom wall opposite of its top wall, a sidewall extending between and connected to perimeter edges of its top and bottom walls, and a plurality of tethers extending between and connected to interior surfaces of its top and bottom walls. The bottom wall of the first bladder is secured to the top wall of the third bladder. The bottom wall of the second bladder is secured to the top wall of the fourth bladder. When the third and fourth bladders are inflated, the sidewall of the fourth bladder abuts the sidewall of the third bladder. The at least one releasable attachment mechanism includes a second releasable attachment mechanism that releasably attaches the one sidewall of the fourth bladder to the one sidewall of the third bladder.

In one example, the inflatable system further includes a first membrane disposed between the first and third bladders and a second membrane disposed between the second and fourth bladders. The bottom wall of the first bladder is one of attached to and formed by a top surface of the first membrane, and the top wall of the third bladder is one of attached to and formed by a bottom surface of the first membrane. The bottom wall of the second bladder is one of attached to and formed by a top surface of the second membrane, and the top wall of the fourth bladder is one of attached to and formed by a bottom surface of the second membrane. The at least one releasable attachment mechanism includes a third releasable attachment mechanism that releasably attaches the second membrane to the first membrane.

An example of a vehicle seating and cargo system according to the present disclosure includes a first bladder configured to contain gas and a second bladder configured to contain gas. The first bladder includes a top wall, a bottom wall opposite of the top wall, a sidewall extending between and connected to perimeter edges of the top and bottom walls, and a plurality of tethers extending between and connected to interior surfaces of the top and bottom walls. The second bladder includes a top wall, a bottom wall opposite of its top wall, a sidewall extending between and connected to perimeter edges of its top and bottom walls, and a plurality of tethers extending between and connected to interior surfaces of its top and bottom walls. The bottom wall of the first bladder is secured to the top wall of the second bladder, and/or the second bladder is releasably attached to the first bladder.

In one example, the vehicle seating and cargo system further includes a third bladder configured to contain gas and a fourth bladder configured to contain gas. The third bladder includes a top wall, a bottom wall opposite of its top wall, a sidewall extending between and connected to perimeter edges of its top and bottom walls, and a plurality of tethers extending between and connected to interior surfaces of its top and bottom walls. The fourth bladder includes a top wall, a bottom wall opposite of its top wall, a sidewall extending between and connected to perimeter edges of its top and bottom walls, and a plurality of tethers extending between and connected to interior surfaces of its top and bottom walls. At least one membrane is disposed between the first and second bladders and between the third and fourth bladders. The bottom walls of the first and third bladders are secured to a top surface of the at least one membrane. The top walls of the second and fourth bladders are secured to a bottom surface of the at least one membrane. The first bladder is aligned with the second bladder along a length of the at least one membrane. The third bladder is aligned with the fourth bladder along the length of the at least one membrane.

In one example, the at least one membrane includes a first membrane disposed between the first and second bladders and a second membrane disposed between the third and fourth bladders, and the vehicle seating and cargo system further includes a first releasable attachment mechanism releasably attaching the third bladder to the first bladder, a second releasable attachment mechanism releasably attaching the fourth bladder to the second bladder, and a third releasable attachment mechanism releasably attaching the second membrane to the first membrane.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9A is a perspective view of an example panel according to the present disclosure;

FIG. 9B is a section view of a portion of the panel of FIG. 9A;

FIG. 10 is a perspective view of an example panel assembly according to the present disclosure, where the panel assembly is shown in a rolled-up position;

FIG. 18A is a perspective view of the panel assembly of FIG. 15A, where one upper bladder and one lower bladder in the panel assembly are shown uninflated and the other two bladders in the panel assembly are shown inflated;

FIG. 18B is a side view of the panel assembly of FIG. 15A in the inflation state shown in FIG. 18A, where each panel in the panel assembly is shown unfolded and folded toward the other panel in the panel assembly;

FIG. 19A is a perspective view of the panel assembly of FIG. 15A, where the upper bladders in the panel assembly are shown uninflated and the lower bladders in the panel assembly are shown inflated;

FIG. 19B is a side view of the panel assembly of FIG. 15A in the inflation state shown in FIG. 19A, where one panel in the panel assembly is shown unfolded and folded toward the other panel in the panel assembly;

FIG. 20A is a perspective view of the panel assembly of FIG. 15A, where an upper bladder in the panel assembly is shown uninflated and the other bladders in the panel assembly are shown inflated;

FIG. 20B is a side view of the panel assembly of FIG. 15A in the inflation state shown in FIG. 20A, where one panel in the panel assembly is shown unfolded and folded toward the other panel in the panel assembly;

FIG. 21A is a perspective view of the panel assembly of FIG. 15A, where upper and lower bladders of one panel in the panel assembly are shown uninflated and the other bladders in the panel assembly are shown inflated;

FIG. 21B is a side view of the panel assembly of FIG. 15A in the inflation state shown in FIG. 21A, where the uninflated panel is shown unrolled and rolled up;

FIG. 22A is a perspective view of the panel assembly of FIG. 15A, where all of the bladders in the panel assembly are shown uninflated;

FIG. 22B is a side view of the panel assembly of FIG. 15A in the inflation state shown in FIG. 22A, where the panel assembly is shown rolled up;

In the drawings, reference numbers may be reused to identify similar and/or identical elements.

DETAILED DESCRIPTION

Figure 1:
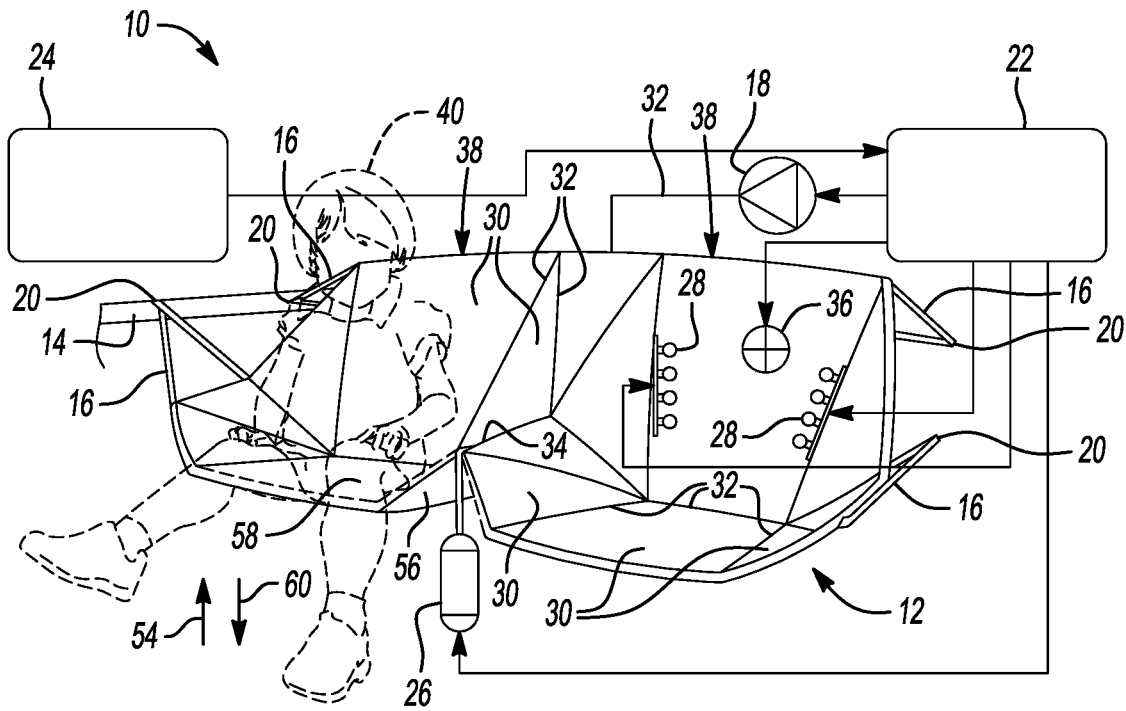
FIGS. 1-4 are perspective views of an example of a reconfigurable seating and cargo system according to the present disclosure.
Figure 2:
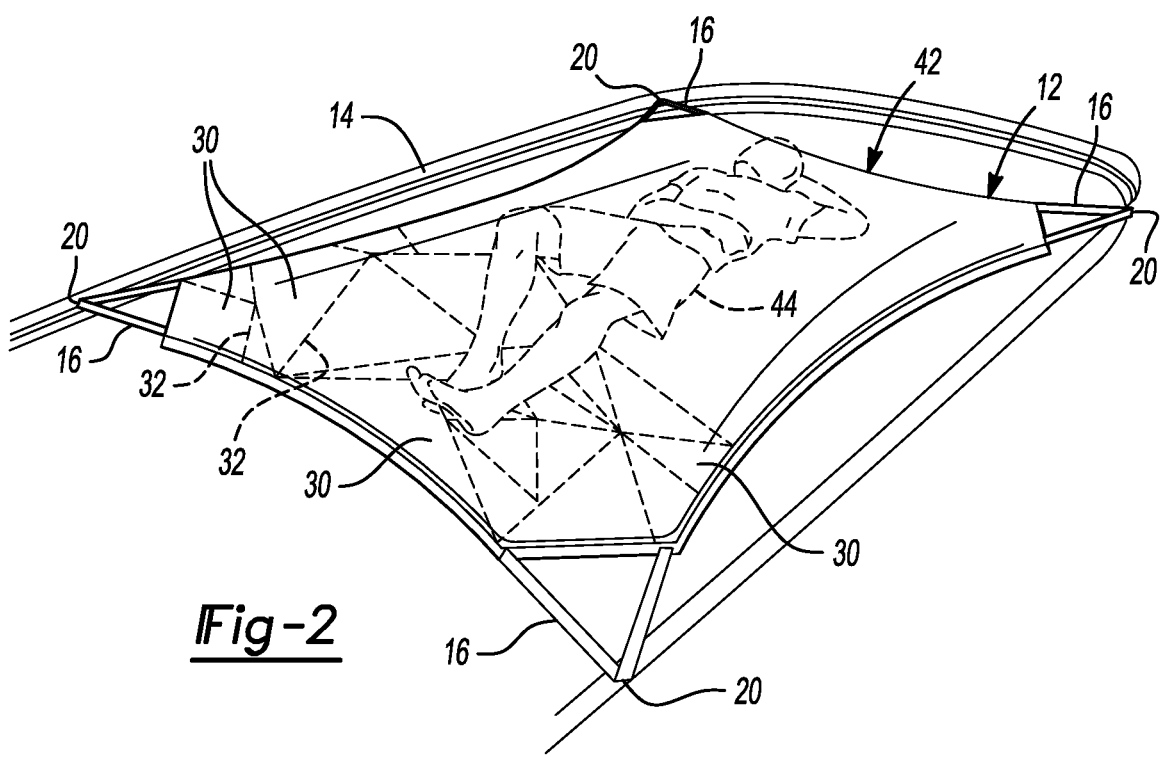

As discussed above, some vehicles include reconfigurable seating and cargo systems that can be adjusted from one configuration to another configuration. Most reconfigurable seating and cargo systems include plates and links, which can be heavy, bulky, and difficult to articulate. In addition, most reconfigurable seating and cargo systems are limited in their number of potential configurations.

In contrast, seating and cargo systems according the present disclosure includes soft, textile surfaces with an array of integrated inflatable panels that allow or restrict folding in preferential locations and directions. For example, the panels can be inflated to provide load-bearing capabilities and rigidity, and the panels can be deflated to allow rolling up the deflated panels or to allow folding inflated panels adjacent to the deflated panels. The soft, textile nature of the systems allow for efficient stowing since the panels can be folded and/or rolled up when not in use. In addition, the inflatable panels can be reversibly or releasably attached to one another and/or deflated for efficient stowing or repurposing. Further, the panel array can be attached to a supporting frame using multiple sets of attachment points to further define the system's configuration and appropriately transfer loads to the frame. The frame may be mounted to or part of an interior sidewall of a vehicle.

The present disclosures provides examples in which the systems are incorporated into vehicle interior structures such as a vehicle seat or cargo holder. However, the soft structural systems according to the present disclosure can also be used to form exterior surfaces and shells. For example, the systems can be integrated into exterior structures of a recreational vehicle such as a canopy or tent structure. In addition, the systems can be integrated into other structural applications where reconfigurability is desired, such as home furniture, lawn furniture, or recreational equipment.

Referring now to FIGS. 1-4, a reconfigurable seating and cargo system 10 includes an inflatable panel assembly 12, a frame 14, and straps 16 connecting the inflatable panel assembly 12 to the frame 14, and a pump 18. The straps 16 connect the inflatable panel assembly 12 to the frame 14 at one or more attachment point 20. The frame 14 is made from a rigid material such as plastic or metal. The straps 16 are made from a flexible material such as nylon. In the example shown, the reconfigurable seating and cargo system 10 further includes a panel control module 22, a user interface device 24, an actuator 26, and light strips 28.

The inflatable panel assembly 12 includes inflatable panels 30, fold lines 32 and one or more releasable attachment mechanisms 34 between adjacent ones of the panels 30, and a valve 36 disposed in one or more (e.g., each) of the panels 30. Each inflatable panel 30 includes one or more bladders configured to contain gas (e.g., pressurized air). In one example, each inflatable panel 30 includes two bladders configured to contain gas and a membrane disposed between the bladders. The inflatable panels 30 can be folded toward or away from one another about the fold lines 32. The fold lines 32 are represented by solid lines when at least one panel 30 is folded thereabout, and the fold lines 32 are represented by dashed lines when no panel 30 is folded thereabout. The inflatable panels 30 can be attached to and detached from one another using the releasable attachment mechanisms 34. The releasable attachment mechanisms 34 may include zippers, hook-and-loop fasteners, and/or J-shaped structures that hook together.

The inflatable panel assembly 12 can be arranged in different configurations by inflating or deflating various ones of the inflatable panels 30, folding or unfolding the panels 30 about various ones of the fold lines 32, and/or attaching or detaching the panels 30 to/from one another using the releasable attachment mechanisms 34. For example, some of the inflatable panels 30 may be deflated or inflated to allow or restrict folding in preferential locations (e.g., about the fold lines 32) and directions. In another example, one or more (e.g., all) of the inflatable panels 30 may be deflated for efficient storing or repurposing. In the configuration shown in FIG. 1, the inflatable panel assembly 12 forms two seats 38 that are each configured to support an occupant 40 sitting therein. In the configuration shown in FIG. 2, the inflatable panel assembly 12 forms a bed 42 configured to support a human occupant 44 laying therein. In the example shown, the bed 42 does not have any sidewalls.

Figure 3:
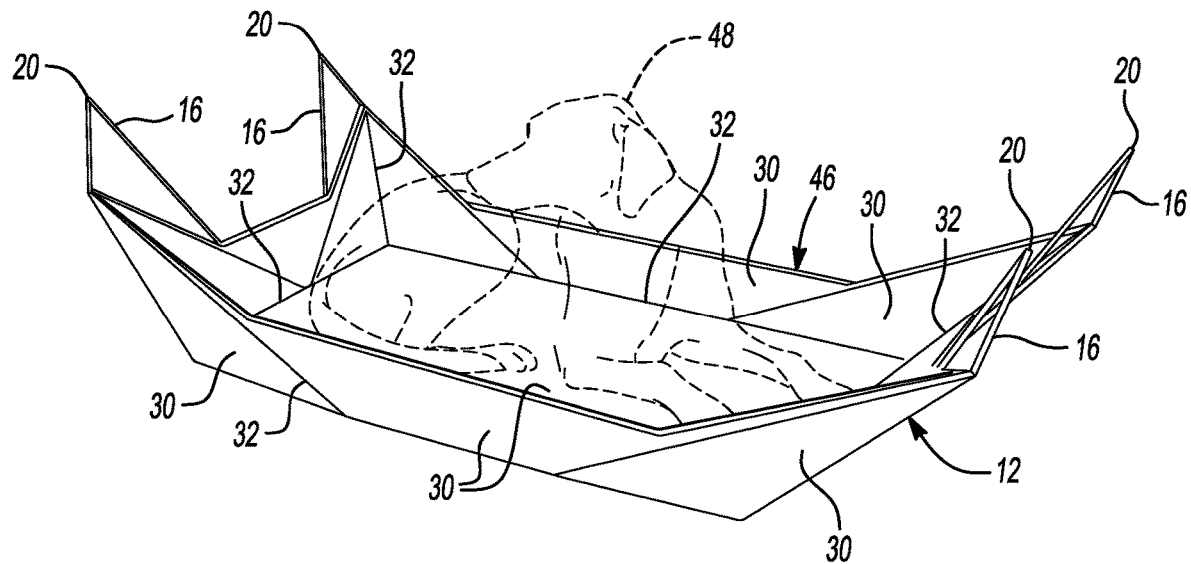
Figure 4:
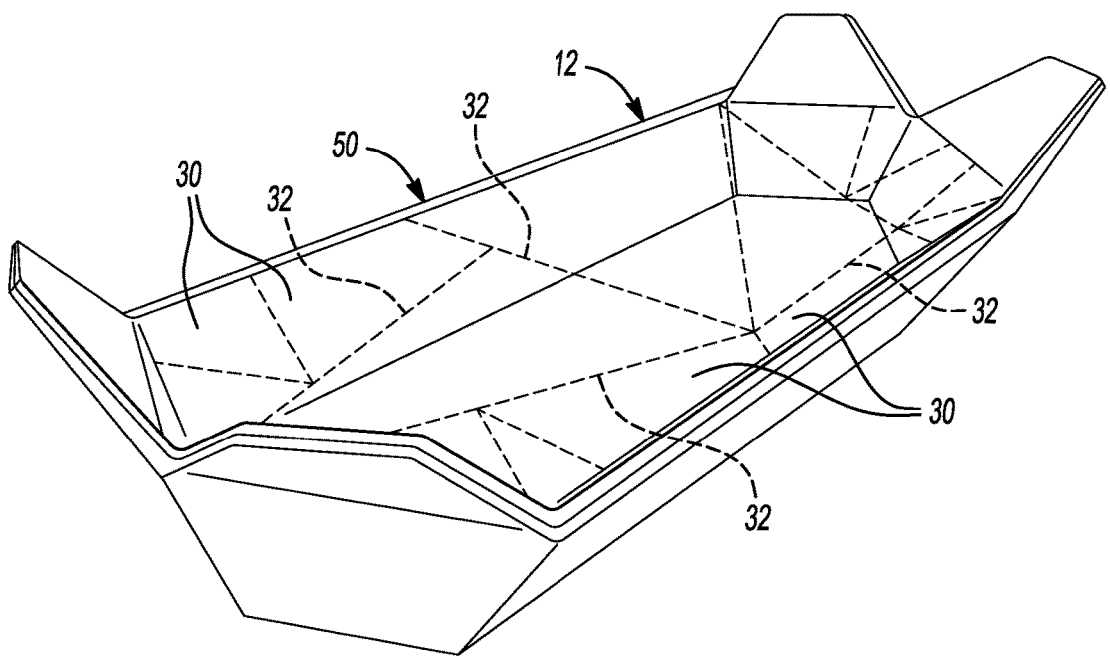

In the configuration shown in FIG. 3, the inflatable panel assembly 12 forms a bed 46 configured to support an animal occupant 48 laying therein. In the example shown, the bed 46 has sidewalls 49 that may help to contain the animal occupant 48. In the configuration shown in FIG. 4, the inflatable panel assembly 12 forms a bed 50 configured to support cargo (not shown) disposed thereon. In each of the configurations shown in FIGS. 1-4, the inflatable panel assembly 12 may be located within a cabin of a vehicle, and the frame 14 may be mounted to an interior sidewall of the vehicle. Thus, for example, the seats 38 of FIG. 1 may be vehicle seats.

The pump 18 is operable to inflate the inflatable panels 30. For example, the pump 18 sends gas to the inflatable panels 30 when the pump 18 is activated (e.g., on). The pump 18 supplies gas to the inflatable panels 30 through a gas supply line 52. The valve 36 is operable to deflate the inflatable panels 30. For example, the valve 36 can be opened to release gas from the inflatable panels 30, and the valve 36 can be closed to prevent the flow of gas out of the inflatable panels 30.

In various implementations, the gas supply line 52 may be connected to the inflatable panels 30 through the valve 36. In these implementations, the inflatable panels 30 may be inflated when the valve 36 is open and the pump 18 is activated, and the inflatable panels 30 may be deflated when the valve 36 is open and the pump 18 is deactivated (i.e., off). In addition, the pump 18 may include a valve that vents to the atmosphere when the pump 18 is deactivated.

The panel control module 22 inflates and deflates the inflatable panels 30 by controlling the pump 18 and/or the valve 36. In one example, the panel control module 22 inflates the inflatable panels 30 by activating the pump 18, and the panel control module 22 deflates the inflatable panels 30 by opening the valve 36. The panel control module 22 may also close the valve 36 when inflating the inflatable panels 30 and deactivate the pump 18 when deflating the inflatable panels 30.

The panel control module 22 may decide which of the inflatable panels 30 to inflate and which of the inflatable panels 30 to deflate based on a target configuration of the inflatable panel assembly 12. The panel control module 22 may receive the target configuration of the inflatable panel assembly 12 from the user interface device 24. In one example, the user interface device 24 is a touchscreen that displays possible configurations of the inflatable panel assembly 12 and outputs the target configuration when the occupant 40 selects one of the possible configurations.

The panel control module 22 may fold the inflatable panels 30 toward or away from one another about the fold lines 32 by controlling the actuator 26. In the example shown, the actuator 26 is a linear actuator. In addition, the actuator 26 is extended in an upward direction 54 to fold a first panel 56 of the inflatable panels 30 toward a second panel 58 of the inflatable panels 30 about the fold line 32 disposed between the first and second panel 56 and 58. Further, the actuator 26 retracted in a downward direction 60 to unfold the first panel 56 away from the second panel 58.

In various implementations, the inflatable panels 30 may be folded toward or away from one another about the fold lines 32 manually (i.e., by hand). Additionally or alternatively, the inflatable panels 30 may be attached to or detached from one another by manually manipulating the releasable attachment mechanisms 34. In these implementations, the panel control module 22 may activate or deactivate the light strips 28 to indicate when edges of the inflatable panels 30 are to be joined together in order to achieve the target configuration. For example, the light strips 28 may illuminate in one of a plurality of colors, and each light strip 28 may be attached to one of the inflatable panels 30 along an edge thereof. In addition, the panel control module 22 may illuminate two of light strips 28 using the same color to indicate that the corresponding edges on the inflatable panels 30 are to be joined together.

Figure 5:
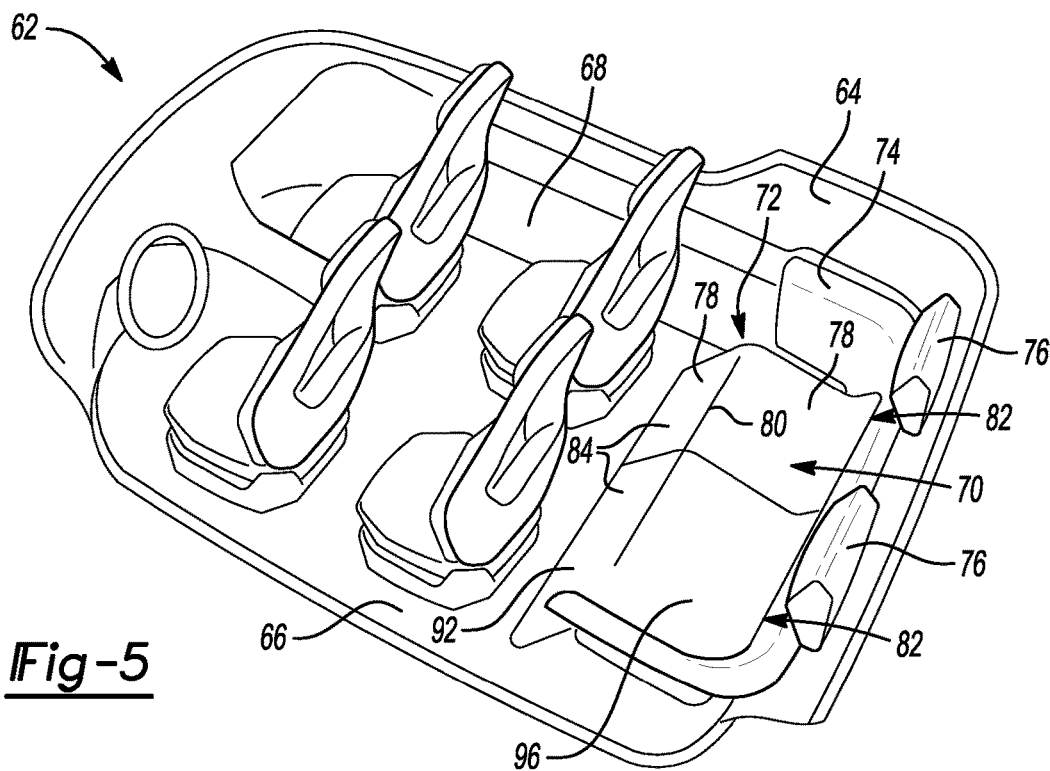
FIGS. 5 and 6 are perspective views of another example of a reconfigurable seating and cargo system according to the present disclosure.
Figure 6:
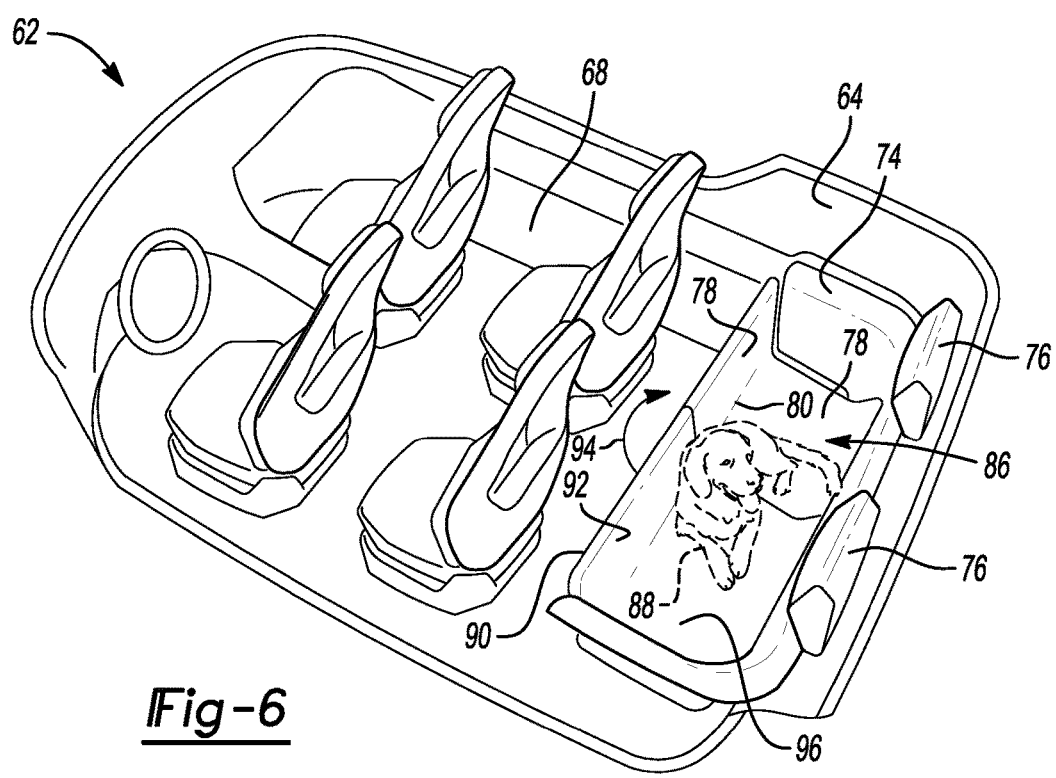

Referring now to FIGS. 5 and 6, a vehicle 62 includes an interior sidewall 64, a floor 66, a passenger cabin 68 enclosed by the interior sidewall 64, and a reconfigurable seating and cargo system 70 disposed within the passenger cabin 68. The reconfigurable seating and cargo system 70 includes an inflatable panel assembly 72, a frame 74, and headrests 76. Each of the frame 74 and the headrests 76 may include a rigid structure and cushion material surrounding the rigid structure.

The inflatable panel assembly 72 includes inflatable panels 78 and fold lines 80 between adjacent ones of the inflatable panels 78. Each inflatable panel 78 includes one or more bladders configured to contain gas (e.g., pressurized air). In one example, each inflatable panel 78 includes two bladders configured to contain gas and a membrane disposed between the bladders. The inflatable panels 78 can be folded toward or away from one another about the fold lines 80.

The inflatable panel assembly 72 can be arranged different configurations by inflating or deflating various ones of the inflatable panels 78 and/or folding or unfolding the inflatable panels 78 about various ones of the fold lines 80. In the configuration shown in FIG. 5, the inflatable panel assembly 72 forms two seats 82 that are each configured to support a human occupant (not shown) sitting therein. Each seat 82 includes a leg rest 84 configured to support the legs of the occupant. In the configuration shown in FIG. 6, the inflatable panel assembly 72 forms a bed 86 configured to support and contain an animal occupant 88 or cargo (not shown). The bed 86 includes a front wall 90 that prevents the animal occupant 88 or cargo from moving forward in the vehicle 62 when, for example, the vehicle 62 stops abruptly.

To switch from the configuration shown in FIG. 5 to the configuration shown in FIG. 6, a first panel 92 of the inflatable panels 78 is folded in a first direction 94 toward a second panel 96 of the inflatable panels 78. In the configuration shown in FIG. 6, the first panel 92 forms the front wall 90. To switch from the configuration shown in FIG. 6 to the configuration shown in FIG. 5, the first panel 92 is folded in a second direction opposite of the first direction. In the configuration shown in FIG. 6, the first panel 92 forms the leg rest 84.

Figure 7:
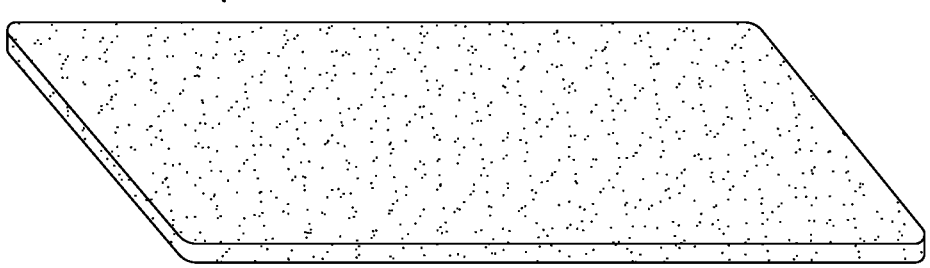
FIG. 7 is a perspective view of an example membrane according to the present disclosure.

Referring now to FIG. 7, an example of a membrane that may be included in the inflatable panels 30, 78 is labelled 98. The membrane 98 is a flexible sheet of material that can be folded or rolled up. In one example, the membrane 98 is made from a textile material and/or a rubber material.

Figure 8A:
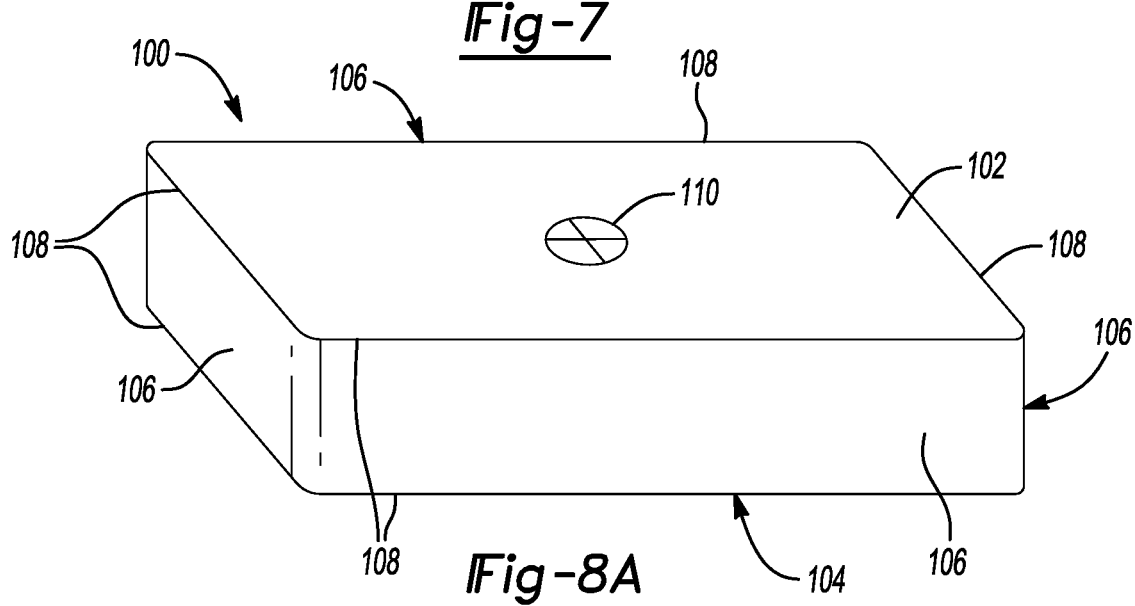
FIG. 8A is a perspective view of an example bladder according to the present disclosure.
Figure 8B:
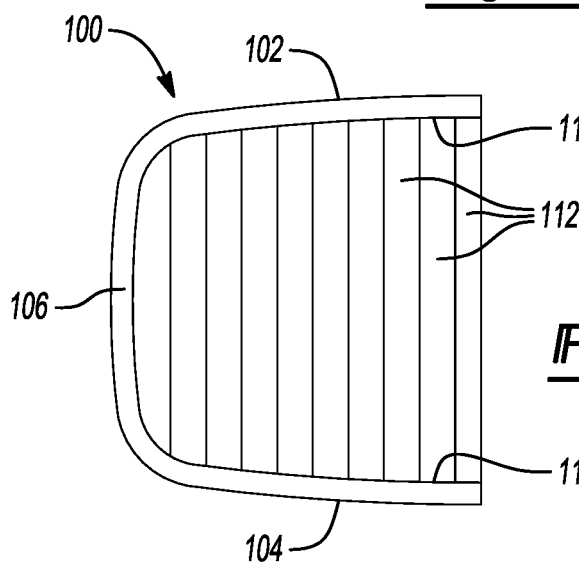
FIG. 8B is a section view of a portion of the bladder of FIG. 8A.

Referring now to FIGS. 8A and 8B, an example of a bladder that may be included in the inflatable panels 30, 78 is labelled 100. The bladder 100 is configured to contain gas (e.g., pressurized air). The bladder 100 may be made from a thin layer of material such as thermoplastic polyurethane (TPU) or silicone coated fabric (e.g., nylon, polyester, Kevlar, etc.). The thickness of the bladder 100 may vary from 0.1 millimeters (mm) to 10 mm depending on the pressure range of the bladder 100.

The bladder 100 includes a top wall 102, a bottom wall 104 opposite of the top wall 102, sidewalls 106 extending between and connected to perimeter edges 108 of the top and bottom walls 102 and 104, and a valve 110 extending through the top wall 102. The valve 110 allows gas to enter and exit the bladder 100 when the valve 110 is open. The valve 110 prevents gas flow into and out of the bladder 100 when the valve 110 is closed. Although the valve 110 is shown extending through the top wall 102 of the bladder 100, the valve 110 may extend through the bottom wall 104 of the bladder 100 or through one of the sidewalls 106 of the bladder 100.

The bladder 100 further incudes a plurality of tethers 112 extending between and connected to interior surfaces 114 of the top and bottom walls 102 and 104 of the bladder 100. The tethers 112 limit expansion of the bladder 100 when the bladder 100 is inflated. In addition, the tethers 112 increase the amount of compressive force that the bladder 100 may withstand before the bladder 100 deforms in response to the compressive force. Further, the tethers 112 may cause the bladder 100 to have a curved surface contour when the bladder 100 is inflated.

The tethers 112 may be connected to the top and bottom walls 102 and 104 using three-dimensional (3D) knitting, weft knitting, hand stitching, an embroidering machine, and/or a clothing tag installation device. The tethers 112 may include monofilament threads, such as wires, and/or multifilament threads, such as yarn. Additionally or alternatively, the tethers 112 may include cables and/or ribbons (or tapes). The tethers 112 may have cross-sectional shapes that are circular, star-shaped, and/or rectangular. The tethers 112 may be made of a material such as artificial muscle or shape memory alloy (SMA) so that the tethers 112 can be contracted or expanded to influence the fold of the bladder 100.

Referring now to FIGS. 9A and 9B, an example of each of the inflatable panels 30, 78 of FIGS. 1-6 is labelled 116. The inflatable panel 116 includes a first bladder 118, a second bladder 120, and a membrane 122 disposed between the first and second bladders 118 and 120. Each of the first and second bladders 118 and 120 is similar or identical to the bladder 100 of FIGS. 8A and 8B.

The first bladder 118 is inflatable and deflatable independent of inflation and deflation of the second bladder 120. The second bladder 120 is inflatable and deflatable independent of inflation and deflation of the first bladder 118. Since the top wall 102 of the second bladder 120 is attached to the bottom surface 126 of the membrane 122, the valve 110 may not extend through the top wall 102 of the second bladder 120. Instead, the valve 110 may extend through the bottom wall 104 of the second bladder 120 or through one of the sidewalls 106 of the second bladder 120. The second bladder 120 may otherwise be identical to the bladder 100 of FIGS. 8A and 8B.

The membrane 122 is similar or identical to the membrane 98 of FIG. 7. The membrane 122 has a top surface 124 and the bottom surface 126. The bottom wall 104 of the first bladder 118 is attached (e.g., glued) to or formed by the top surface 124 of the membrane 122. The top wall 102 of the second bladder 120 is attached (e.g., glued) to or formed by the bottom surface 126 of the membrane 122. Thus, the bottom wall 104 of the first bladder 118 is secured to the top wall 102 of the second bladder 120 through the membrane 122.

Referring now to FIGS. 10-14, an example of each of the inflatable panel assemblies 12, 70 of FIGS. 1-6 is labelled 128. The inflatable panel assembly 128 includes multiple ones of the inflatable panel 116 disposed side-by-side with a single membrane 130 disposed between the first and second bladders 118 and 120 of all of the inflatable panels 116. In the example shown, the inflatable panel assembly 128 includes three inflatable panels 116 across its width and four inflatable panels 116 across its length.

Figure 11:
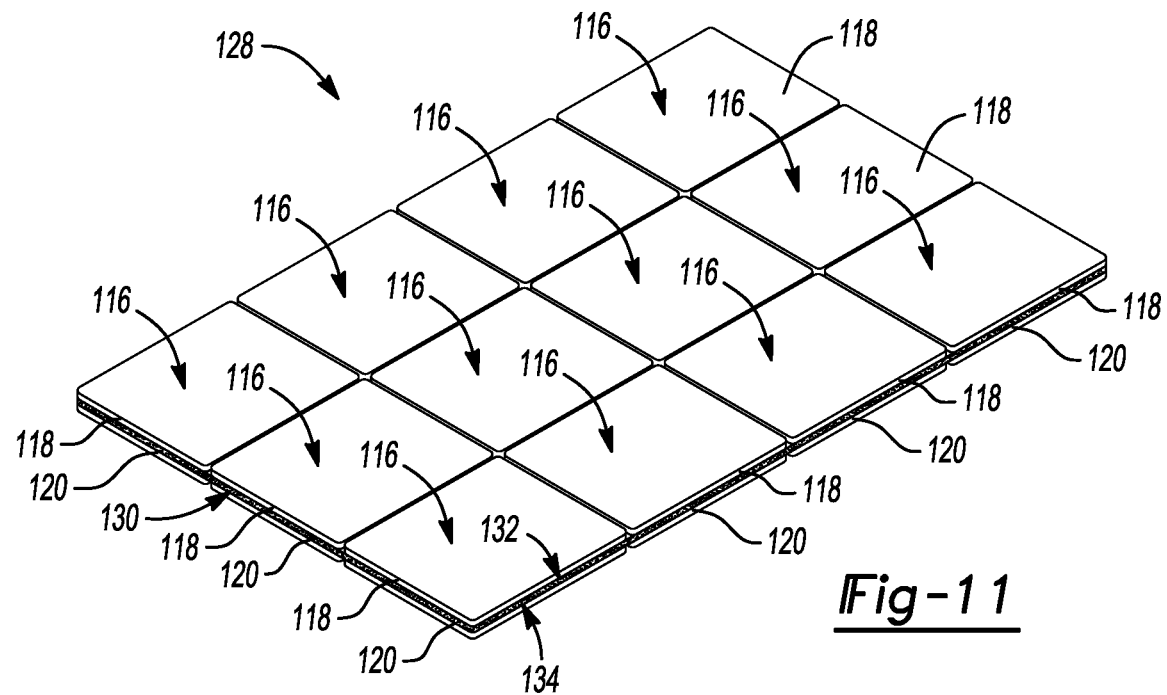
FIG. 11 is a perspective view of the panel assembly of FIG. 10, where the panel assembly is shown in an unrolled position and an uninflated state.
Figure 12:
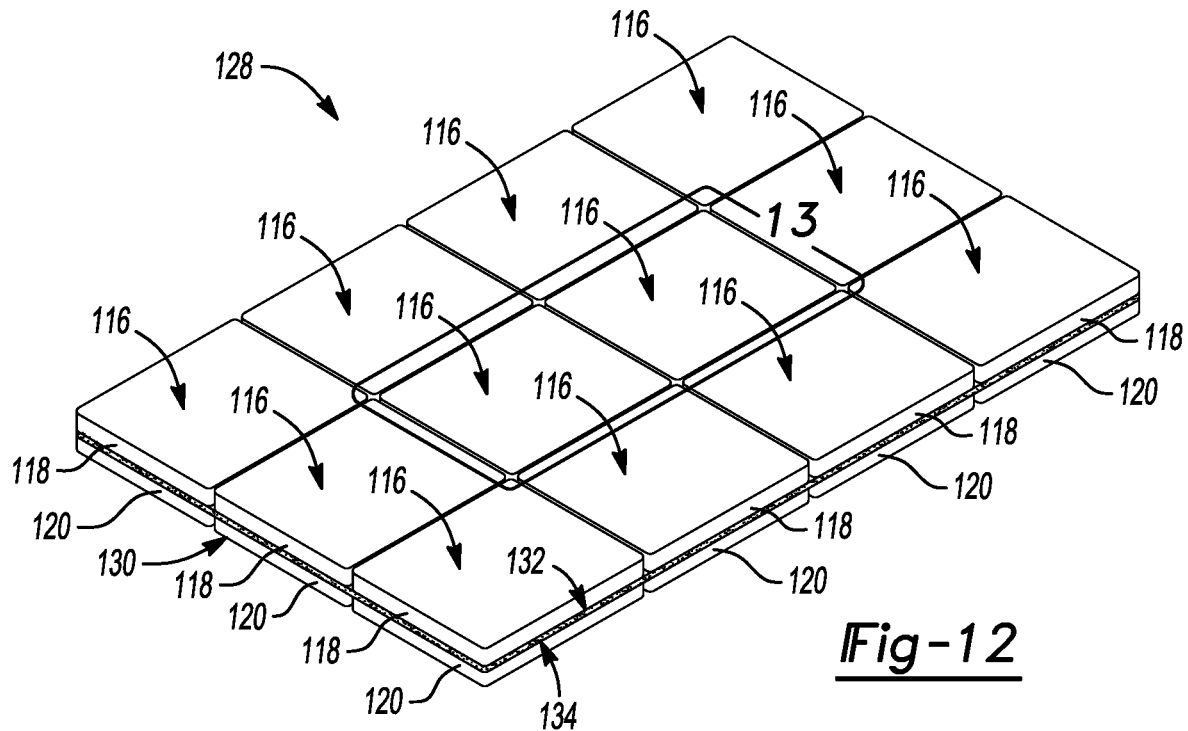
FIG. 12 is a perspective view of the panel assembly of FIG. 10, where the panel assembly is shown in the unrolled position and an inflated state.
Figure 13:
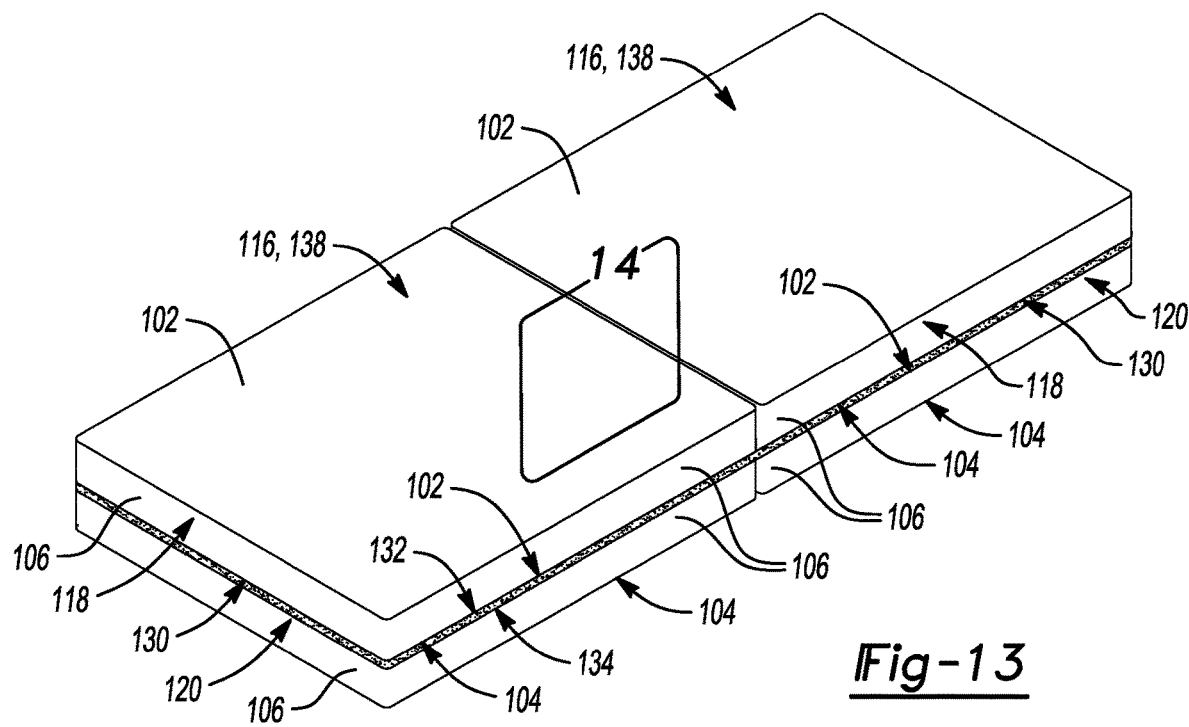
FIG. 13 is a perspective view of a portion of the panel assembly of FIG. 10 within a rectangle 13 shown in FIG. 12.
Figure 14:
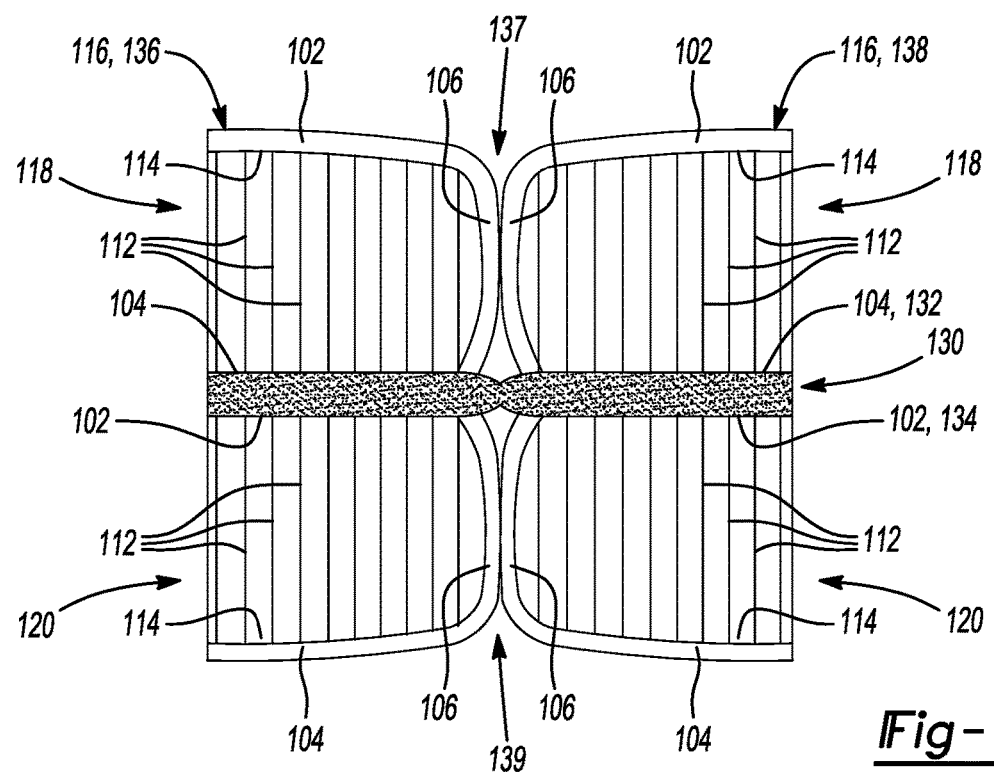
FIG. 14 is a section view of a portion of the panel assembly of FIG. 10 within a rectangle 14 shown in FIG. 13.

In FIG. 10, the first and second bladders 118 and 120 of all of the inflatable panels 116 in the inflatable panel assembly 128 are deflated, and the inflatable panel assembly 128 is rolled up. In FIG. 11, the first and second bladders 118 and 120 of all of the inflatable panels 116 in the inflatable panel assembly 128 are deflated, and the inflatable panel assembly 128 is unrolled. In FIGS. 12-14, the first and second bladders 118 and 120 of all of the inflatable panels 116 in the inflatable panel assembly 128 are inflated, and the inflatable panel assembly 128 is unrolled. FIG. 13 shows only two of the inflatable panel 116 in the inflatable panel assembly 128, and FIG. 14 shows a section view of a portion of those two inflatable panels 116.

In various implementations, one or more the first and second bladders 118 and 120 can include a section with extra surface area. In turn, when the respective bladder 118 or 120, this section would create a bubble or rib. This rib could function as a locating feature for use in locating the inflatable panel assembly 128 in the vehicle. In addition, if the tethers in this section are cinched before inflation (e.g., using artificial muscles or SMA), the section may act as a hinge by causing the respective bladder 118 or 120 to fold in that location.

The membrane 130 may be identical to the membrane 98 of the FIG. 7 except that the width and length of the membrane 130 may be larger than the width and length of the membrane 98 so the membrane 130 spans across the entire width and length of the inflatable panel assembly 128. For example, the width and length of the membrane 98 may be equal to the width and length of each inflatable panel 116. In contrast, the width of the membrane 130 may be three times larger than the width of each inflatable panel 116, and the length of the membrane 130 may be four times larger than the length of the inflatable panel 116.

The membrane 130 has a top surface 132 and a bottom surface 134. The bottom wall 104 of the first bladder 118 of each inflatable panel 116 is attached (e.g., glued) to or formed by the top surface 132 of the membrane 130. The top wall 102 of the second bladder 120 of each inflatable panel 116 is attached (e.g., glued) to or formed by the bottom surface 134 of the membrane 130. Thus, the bottom wall 104 of the first bladder 118 of each inflatable panel 116 is secured to the top wall 102 of the second bladder 120 of the same inflatable panel 116 through the membrane 130. In addition, all of the inflatable panels 116 in the inflatable panel assembly 128 are secured to one another through the membrane 130.

In one example, a first panel 136 of the inflatable panels 116 is secured to a second panel 138 of the inflatable panels 116 through the membrane 130, and the first and second panels 136 and 138 are adjacent to one another. Thus, when the first and second bladders 118 and 120 of the first and second panels 136 and 138 are inflated, one of the sidewalls 106 of the first bladder 118 in the first panel 136 abuts one of the sidewalls 106 of the first bladder 118 in the second panel 138 at a first location along the length of the membrane 130. In addition, one of the sidewalls 106 of the second bladder 120 in the first panel 136 abuts one of the sidewalls 106 of the second bladder 120 in the second panel 138 at a second location along the length of the membrane 130. The second location is the same as the first location. Further, an interface 137 between the abutting sidewalls 106 of the first bladders 118 in the first and second panels 136 and 138 is disposed above an interface 139 between the abutting sidewalls 106 of the second bladders 120 in the first and second panels 136 and 138.

This contact between adjacent ones of the inflatable panels 116 in the inflatable panel assembly 128 when the first and second bladders 118 and 120 of the inflatable panels 116 are inflated restricts the relative motion of the inflatable panels 116. For example, the inflation state of the first and second bladders 118 and 120 of the inflatable panels 116 (i.e., whether the inflatable panels 116 are inflated or deflated) affects whether the inflatable panels 116 can be rolled up or folded relative to one another. The examples described below with respect to FIGS. 15A-25 illustrate this point.

Figure 15A:
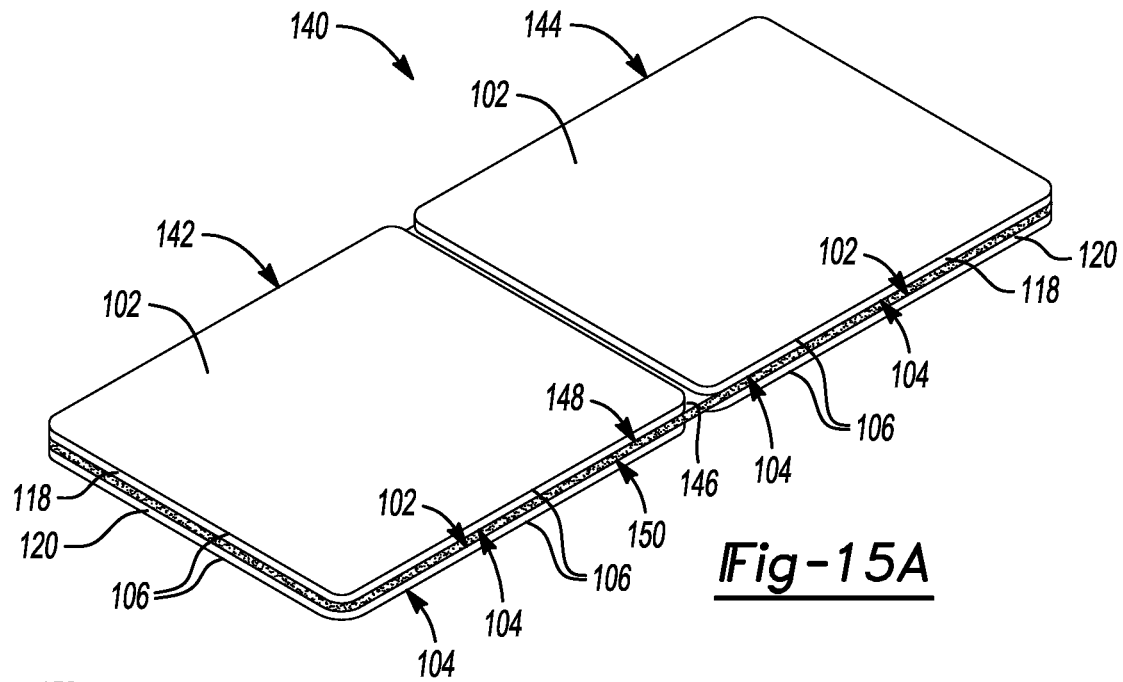
FIG. 15A is a perspective view of another example panel assembly according to the present disclosure.
Figure 15B:
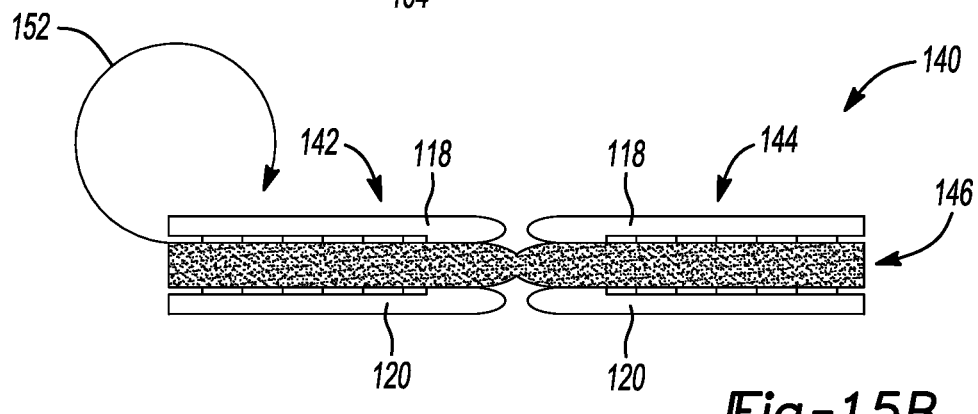
FIG. 15B is a side view of a portion of the panel assembly of FIG. 15A shown in an unrolled position and an uninflated state.
Figure 15C:
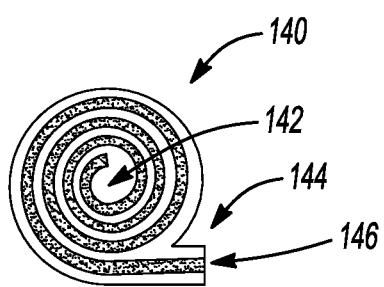
FIG. 15C is a side view of a portion of the panel assembly of FIG. 15A shown in the uninflated state and a rolled-up position.

Referring now to FIGS. 15A-15C, an inflatable panel assembly 140 is shown that includes a first inflatable panel 142 disposed adjacent to a second inflatable panel 144. Each of the first and second inflatable panel 142 and 144 may be similar or identical to the inflatable panel 116 of FIGS. 9A and 9B. The first and second inflatable panels 142 and 144 are secured to one another through a membrane 146. The membrane 146 is disposed between the first and second bladders 118 and 120 of the first inflatable panel 142 and between the first and second bladders 118 and 120 of the second inflatable panel 144. The membrane 146 may be similar or identical to the membrane 98 of FIG. 7 except that the membrane 146 may be longer than the membrane 98 so that the membrane 146 spans across the entire length of the inflatable panel assembly 140.

The membrane 146 has a top surface 148 and a bottom surface 150. The bottom wall 104 of the first bladder 118 of each inflatable panel 142, 144 is attached (e.g., glued) to or formed by the top surface 148 of the membrane 146. The top wall 102 of the second bladder 120 of each inflatable panel 142, 144 is attached (e.g., glued) to or formed by the bottom surface 150 of the membrane 146. Thus, the first and second inflatable panels 142 and 144 are secured to one another through the membrane 146.

In FIGS. 15A-15C, the first and second bladders 118 and 120 of the first and second inflatable panels 142 and 144 are deflated. In addition, in FIGS. 15A and 15B, the inflatable panel assembly 140 is unrolled. However, in FIG. 15C, the inflatable panel assembly 140 is rolled up a direction 152 shown in FIG. 15B. Deflating the first and second bladders 118 and 120 of the first and second inflatable panels 142 and 144 enables rolling up the inflatable panel assembly 140.

Figure 16A:
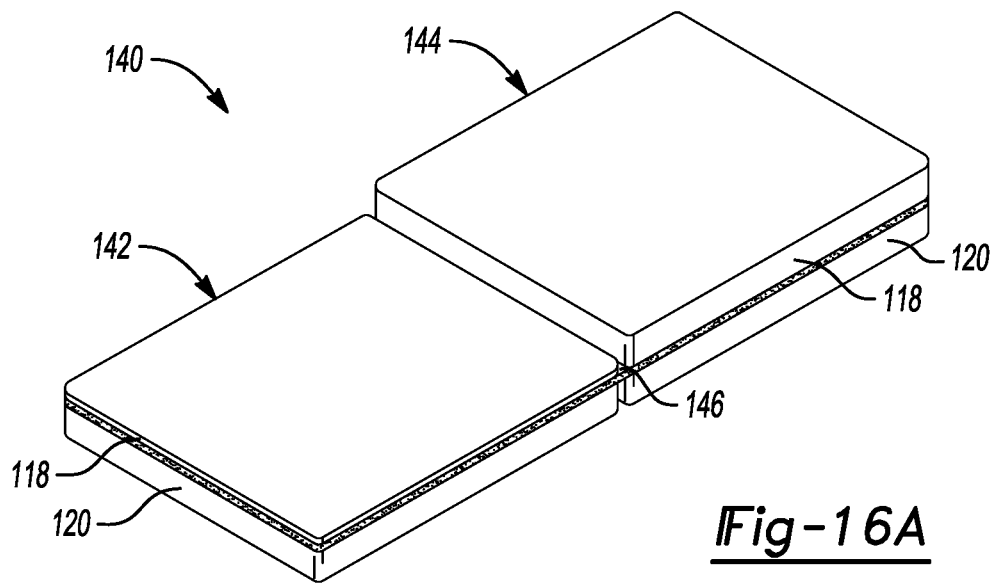
FIG. 16A is a perspective view of the panel assembly of FIG. 15A, where an upper bladder in the panel assembly is shown uninflated and the other bladders in the panel assembly are shown inflated.
Figure 16B:
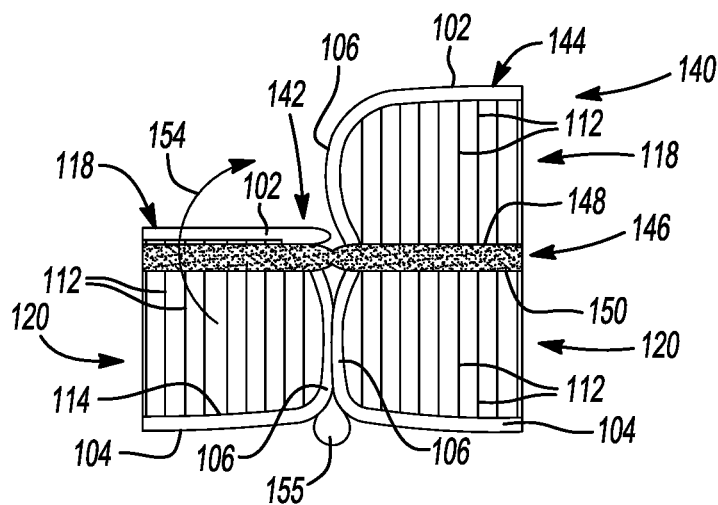
FIG. 16B is a section view of the panel assembly of FIG. 15A in the inflation state shown in FIG. 16A and an unfolded position.
Figure 16C:
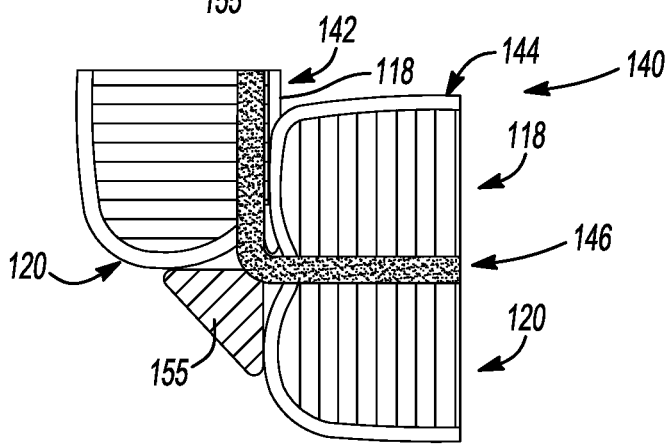
FIG. 16C is a section view of the panel assembly of FIG. 15A in the inflation state shown in FIG. 16A with one panel in the panel assembly folded toward the other panel in the panel assembly.

Referring now to FIGS. 16A-16C, the inflatable panel assembly 140 is shown with the first bladder 118 of the first inflatable panel 142 deflated and the second bladder 120 of the first inflatable panel 142 inflated. In addition, the first and second bladders 118 and 120 of the second inflatable panel 144 are inflated. In FIGS. 16A and 16B, the first and second inflatable panels 142 and 144 are unfolded relative to one another. In FIG. 16C, the first inflatable panels 142 is folded in a direction 154 toward the second inflatable panel 144. Deflating the first bladder 118 of the first inflatable panel 142 enables folding the first inflatable panel 142 toward the second inflatable panel 144.

In various implementations, the inflatable panel assembly 140 may include a third bladder 155 disposed between the first bladders 118 of the first and second inflatable panels 142 and 144 and/or between the second bladders 120 of the first and second inflatable panels 142 and 144. The third bladder 155 can act as the articulation force to change the shape or position of the inflatable panel assembly 140. In the example shown, the third bladder 155 is disposed between the second bladders 120 of the first and second inflatable panels 142 and 144. The third bladder 155 can be inflated to fold the first inflatable panel 142 toward the second inflatable panel 144 as shown in FIG. 16C, and the third bladder 155 can be deflated to allow the first inflatable panel 142 to unfold as shown in FIGS. 16A and 16B.

Instead of or in addition to using the third bladder 155 as the activation force, the change in shape or position of the inflatable panel assembly 140 may be activated by the shape of one or more of the first and second bladders 118 and 120. For example, a bladder with a wedge shape may be placed next to a bladder with a rectangular shape such that, when the bladders are inflated, the interaction between the wedge- and rectangular-shaped bladders causes movement in a third dimension. In another example, the second bladder 120 of the first inflatable panel 146 has a rectangular shape, and the second bladder 120 of the second inflatable panel 144 has a wedge shape. The wedge-shaped bladder 120 can be inflated to fold the first inflatable panel 142 toward the second inflatable panel 144 as shown in FIG. 16C, and the wedge-shaped bladder 120 can be deflated to allow the first inflatable panel 142 to unfold as shown in FIGS. 16A and 16B.

Figure 17A:
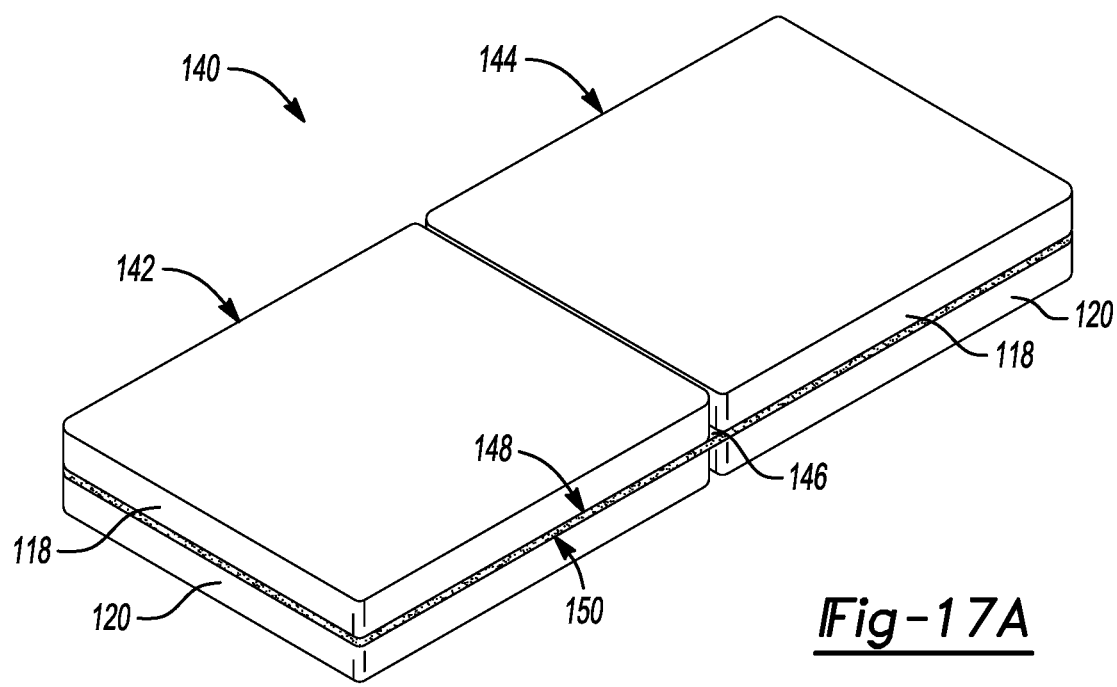
FIG. 17A is a perspective view of the panel assembly of FIG. 15A, where all panels in the panel assembly are shown inflated.
Figure 17B:
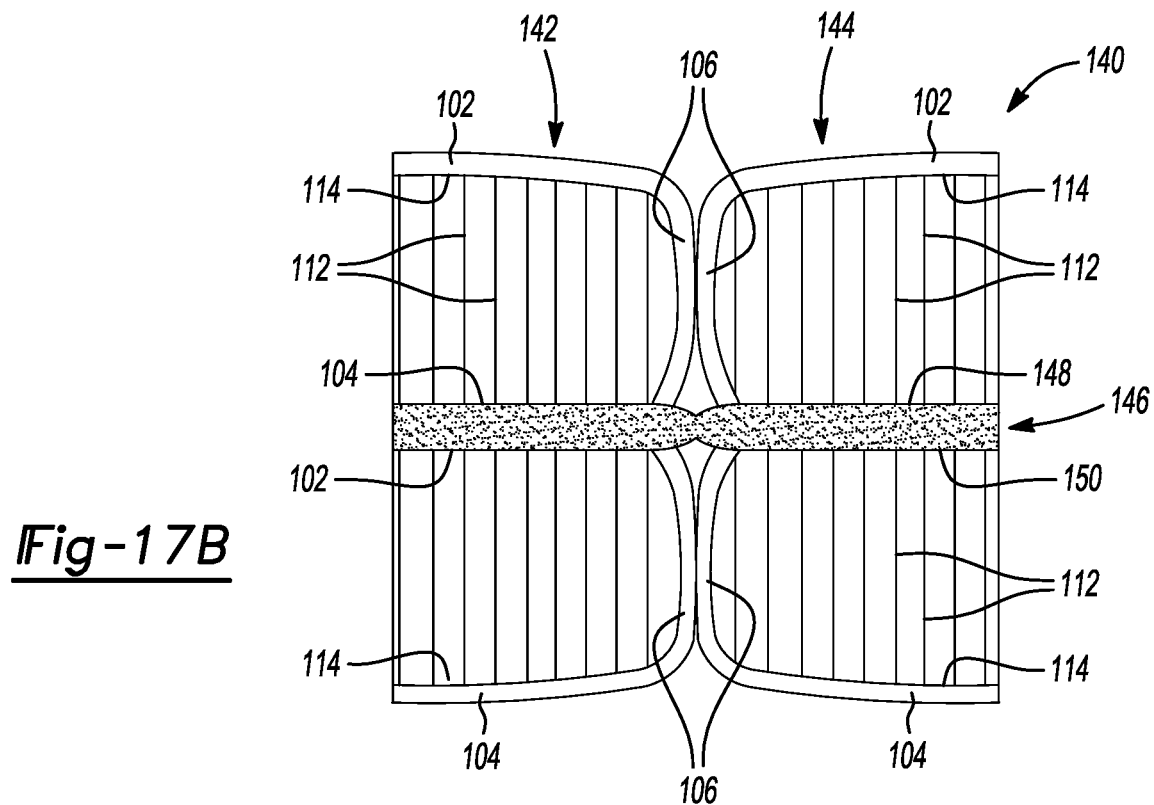
FIG. 17B is a section view of a portion of the panel assembly of FIG. 15A in the inflation state shown in FIG. 17A.

Referring now to FIGS. 17A and 17B, the inflatable panel assembly 140 is shown with the first and second bladders 118 and 120 of the first and second inflatable panels 142 and 144 inflated. In this inflation state, one of the sidewalls 106 of the first bladder 118 in the first inflatable panel 142 abuts one of the sidewalls 106 of the first bladder 118 in the second inflatable panel 144. In addition, one of the sidewalls 106 of the second bladder 120 in the first inflatable panel 142 abuts one of the sidewalls 106 of the second bladder 120 in the second inflatable panel 144. The engagement between the sidewalls 106 of the first bladders 118 and between the sidewalls 106 of the second bladders 120 prevents folding the first inflatable panel 142 toward the second inflatable panel 144 or vice versa.

Referring now to FIGS. 18A and 18B, the inflatable panel assembly 140 is shown with the first bladder 118 of the first inflatable panel 142 deflated and the second bladder 120 of the first inflatable panel 142 inflated. In addition, the first bladder 118 of the second inflatable panel 144 is inflated and the second bladder 120 of the second inflatable panel 144 is deflated. In FIG. 18A, the first and second inflatable panels 142 and 144 are unfolded relative to one another.

In FIG. 18B, the first inflatable panel 142 is folded by 90 degrees in the direction 154 toward the second inflatable panel 144, and the second inflatable panel 144 is folded by 90 degrees in the direction 154 toward the first inflatable panel 142. Deflating the first bladder 118 of the first inflatable panel 142 enables folding the first inflatable panel 142 toward the second inflatable panel 144 by 90 degrees. Deflating the second bladder 120 of the second inflatable panel 144 enables folding the second inflatable panel 144 toward the first inflatable panel 142 by 90 degrees.

The first and second bladders 118 and 120 of the inflatable panel assembly 140 may be inflated and deflated as shown in FIG. 18A to achieve the articulation shown in FIGS. 5 and 6. For example, the first inflatable panel 142 may be used as the first panel 92 in the inflatable panel assembly 72, and the second inflatable panel 144 may be used as the second panel 96 of the inflatable panel assembly 72. Relative to the position shown in FIG. 18A, the first inflatable panel 142 may be rotated by 90 degrees toward the second inflatable panel 144 in a direction 156 opposite of the direction 154 to achieve the configuration shown in FIG. 5. The first inflatable panel 142 may then be rotated toward the second inflatable panel 144 in the direction 154 by 180 degrees to achieve the configuration shown in FIG. 6.

Referring now to FIGS. 19A and 19B, the inflatable panel assembly 140 is shown with the first bladders 118 of the first and second inflatable panels 142 and 144 deflated and the second bladders 120 of the inflatable panels 142, 144 inflated. In FIG. 19A, the first and second inflatable panels 142 and 144 are unfolded relative to one another. In FIG. 19B, the first inflatable panel 142 is folded by 180 degrees in the direction 154 toward the second inflatable panel 144. Deflating the first bladder 118 of the first and second inflatable panels 142 and 144 enables folding the first inflatable panel 142 toward the first inflatable panel 142 by 180 degrees.

Referring now to FIGS. 20A and 20B, the inflatable panel assembly 140 is shown with the first bladder 118 of the first inflatable panel 142 deflated and the second bladder 120 of the first inflatable panel 142 inflated. In addition, the first and second bladders 118 and 120 of the second inflatable panel 144 are inflated. In FIG. 20A, the first and second inflatable panels 142 and 144 are unfolded relative to one another. In FIG. 20B, the first inflatable panels 142 is folded by 90 degrees in the direction 154 toward the second inflatable panel 144. Deflating the first bladder 118 of the first inflatable panel 142 enables folding the first inflatable panel 142 toward the second inflatable panel 144 by 90 degrees.

Referring now to FIGS. 21A and 21B, the inflatable panel assembly 140 is shown with the first and second bladders 118 and 120 of the first inflatable panel 142 deflated and the first and second bladders 118 and 120 of the second inflatable panel 144 inflated. In FIG. 21A, each of the first and second inflatable panels 142 and 144 is unrolled. In FIG. 21B, the first inflatable panel 142 is rolled up in the direction 152 while the second inflatable panel 144 is unrolled. Deflating the first and second bladders 118 and 120 of the first inflatable panel 142 enables rolling up the first inflatable panel 142.

Referring now to FIGS. 22A and 22B, the inflatable panel assembly 140 is shown with the first and second bladders 118 and 120 of the first and second inflatable panels 142 and 144 deflated. In FIG. 22A, each of the first and second inflatable panels 142 and 144 is unrolled. In FIG. 22B, the entire inflatable panel assembly 140 is rolled up in the direction 152. Deflating the first and second bladders 118 and 120 of the first and second inflatable panels 142 and 144 enables rolling up the entire inflatable panel assembly 140.

Figure 23:
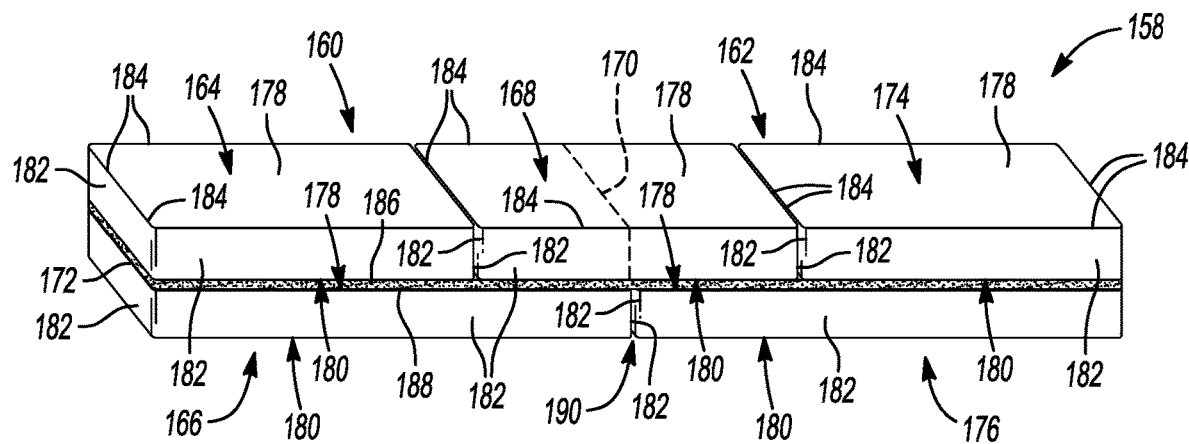
FIG. 23 is a perspective view of another example panel assembly according to the present disclosure.
Figure 24:
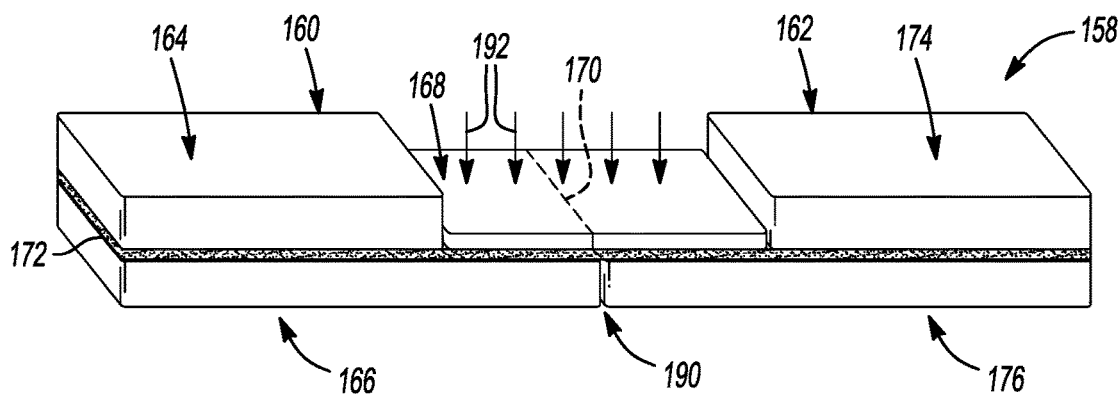
FIG. 24 is a view of the panel assembly of FIG. 23, where an upper bladder of the panel assembly shown uninflated and all of the other bladders of the panel assembly are shown inflated.
Figure 25:
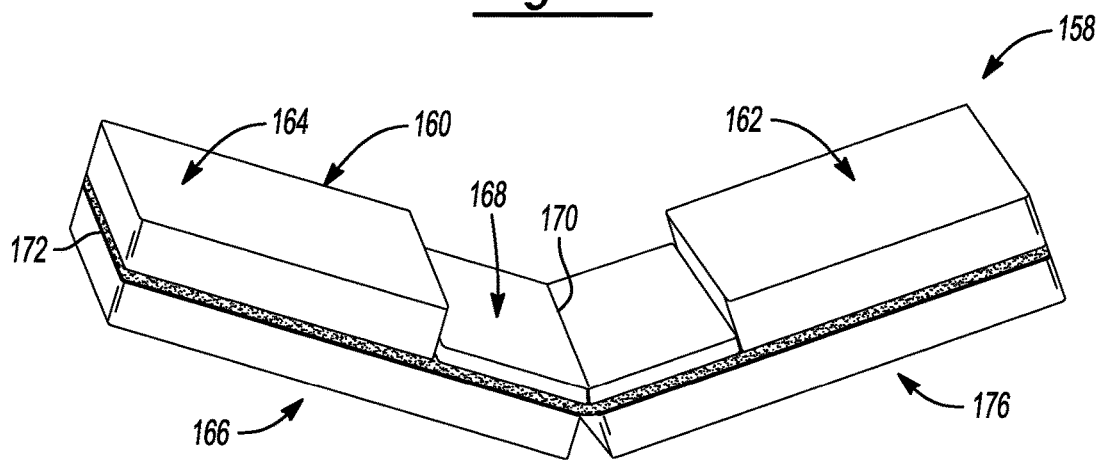
FIG. 25 is a perspective view of the panel assembly of FIG. 23 in the inflation state shown in FIG. 24, where the panels of the panel assembly are folded toward one another.

Referring now to FIGS. 23-25, an inflatable panel assembly 158 is shown that includes a first inflatable panel 160 and a second inflatable panel 162. The first inflatable panel 160 includes a first bladder 164, the second bladder 166, the portion of a third bladder 168 disposed to the left of a fold line 170, and the portion of a membrane 172 disposed to the left of the fold line 170. The second inflatable panel 162 includes a fourth bladder 174, a fifth bladder 176, the portion of the third bladder 168 disposed to the right of the fold line 170, and the portion of the membrane 172 disposed to the right of the fold line 170.

Each of the bladders 164, 166, 168, 174, 176 includes a top wall 178, a bottom wall 180 opposite of the top wall 178, and sidewalls 182 extending between and connected to perimeter edges 184 of the top and bottom walls 178 and 180. In addition, each of the bladders 164, 166, 168, 174, 176 includes tethers extending between and connected to interior surfaces of the top and bottom walls 178 and 180. The tethers within each of the bladders 164, 166, 168, 174, 176 are similar or identical to the tethers 112 of FIG. 8A. Further, one or more (e.g., each) of the bladders 164, 166, 168, 174, 176 may include a valve that extends through the top, bottom or sidewalls 178, 180, or 182 thereof.

The membrane 172 has a top surface 186 and a bottom surface 188. The bottom walls 180 of the first, third, and fourth bladders 164, 168, and 174 are attached (e.g., glued) to or formed by the top surface 186 of the membrane 172. The top walls 178 of the second and fifth bladders 166 and 176 are attached (e.g., glued) to or formed by the bottom surface 188 of the membrane 172. Thus, the first, second, third, fourth, and fifth bladders 164, 166, 168, 174, and 176 are secured to one another through the membrane 172.

In FIG. 23, the first, second, third, fourth, and fifth bladders 164, 166, 168, 174, and 176 are inflated. As a result, one of the sidewalls 182 of the first bladder 164 abuts one of the sidewalls 182 of the third bladder 168 at a first location along the length of the membrane 172, one of the sidewalls 182 of the second bladder 166 abuts one of the sidewalls 182 of the fifth bladder 176 at a second location along the length of the membrane 172, and one of the sidewalls 182 of the third bladder 168 abuts one of the sidewalls 182 of the fourth bladder 174 at a third location along the length of the membrane 172. The second location is different than each of the first and third locations, and the third bladder 168 is disposed above an interface 190 between the abutting sidewalls 182 of the second and fifth bladders 166 and 176.

In FIGS. 24 and 25, the first, second, fourth, and fifth bladders 164, 168, 174, and 176 are inflated, and the third bladder 168 is deflated. In addition, a downward force 192 is applied to the third bladder 168, which causes the first and second inflatable panels 160 and 162 to fold toward one another about the fold line 170 from the position shown in FIG. 24 to the position shown in FIG. 25. Deflating the third bladder 168 enables folding the first and second inflatable panels 160 and 162 toward one another about the fold line 170.

Figure 26A:
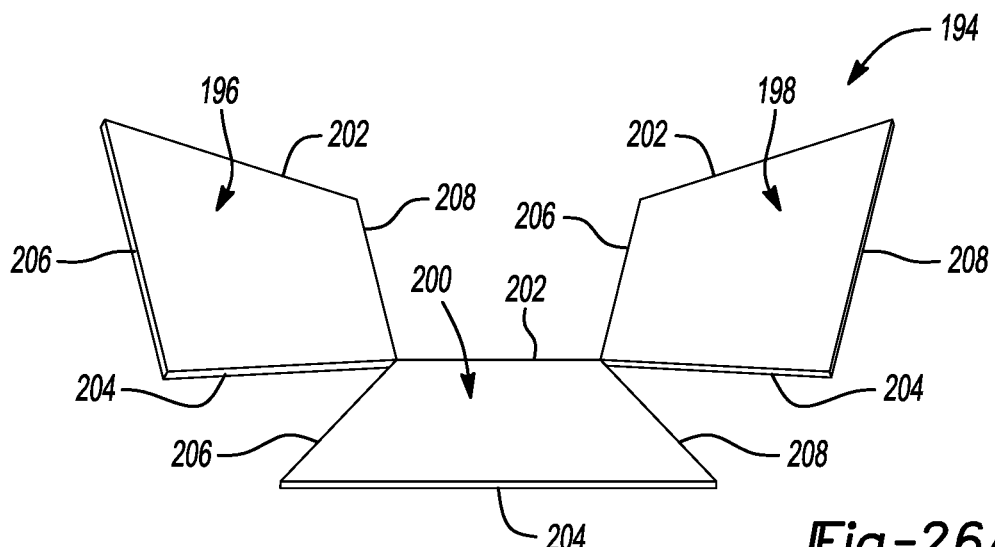
FIG. 26A is a perspective view of an example panel assembly according to the present disclosure including rectangular panels that are releasably attachable to one another.
Figure 26B:
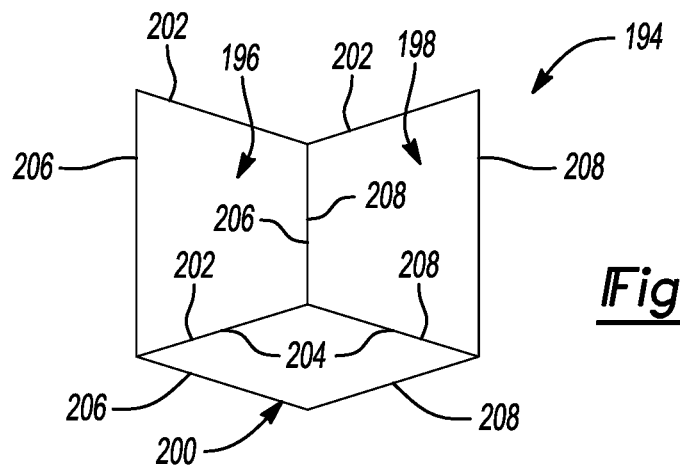
FIG. 26B is a perspective view of the panel assembly of FIG. 26A illustrating one configuration with the panels releasably attached to one another.
Figure 26C:
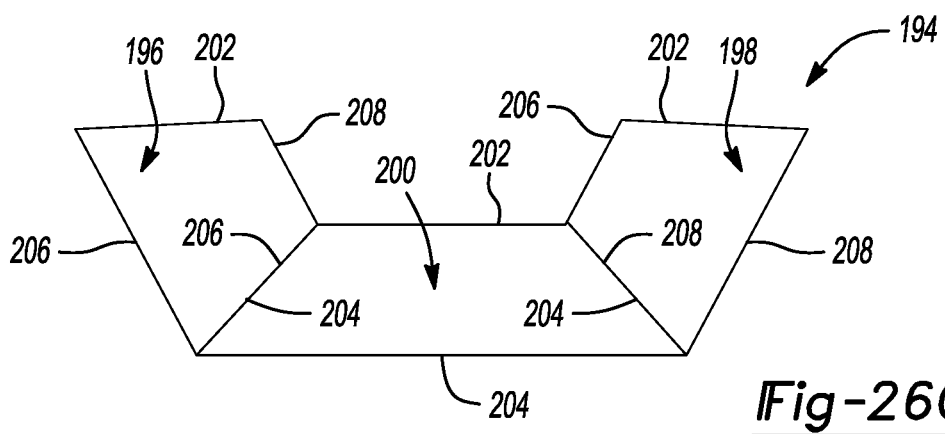
FIG. 26C is a perspective view of the panel assembly of FIG. 26A illustrating another configuration with the panels releasably attached to one another.

Referring now to FIGS. 26A-26C, an inflatable panel assembly 194 is shown that includes a first inflatable panel 196, a second inflatable panel 198, and a third inflatable panel 200. Each of the first, second, third inflatable panels 196, 198 and 200 may have the single bladder layer configuration shown in FIGS. 8A and 8B or the double bladder layer configuration shown in FIGS. 9A and 9B. In addition, each of the first, second, third inflatable panels 196, 198 and 200 is releasably attachable to the others of the first, second, third inflatable panels 196, 198 and 200.

Each of the first, second, and third inflatable panels 196, 198 and 200 has a first edge 202, a second edge 204, a third edge 206, and a fourth edge 208. In addition, each of the first, second, third inflatable panels 196, 198 and 200 includes a releasable attachment mechanism (e.g., a zipper, a hook-and-loop fastener, interlocking J-shaped structures) disposed along one or more (e.g., each) of the first, second, third, and fourth edges 202, 204, 206, and 208. The releasable attachment mechanisms are operable to join one of the first, second, and third inflatable panels 196, 198 and 200 to another one (or other ones) of the first, second, and third inflatable panels 196, 198 and 200.

In FIG. 26A, none of the first, second, or third inflatable panels 196, 198 and 200 are joined to one another. In FIG. 26B, the fourth edge 208 of the first inflatable panel 196 is joined to the third edge 206 of the second inflatable panel 198 using a first releasable attachment mechanism. In addition, the second edge 204 of the first inflatable panel 196 is joined to the first edge 202 of the third inflatable panel 200 using a second releasable attachment mechanism. Further, the second edge 204 of the second inflatable panel 198 is joined to the fourth edge 208 of the third inflatable panel 200 using a third releasable attachment mechanism.

In FIG. 26C, the second edge 204 of the first inflatable panel 196 is joined to the third edge 206 of the third inflatable panel 200 using a fourth releasable attachment mechanism. Further, the second edge 204 of the second inflatable panel 198 is joined to the fourth edge 208 of the third inflatable panel 200 using a fifth releasable attachment mechanism. The first, second, third, fourth, and fifth releasable attachment mechanisms may share components (e.g., zipper halves).

Figure 27A:
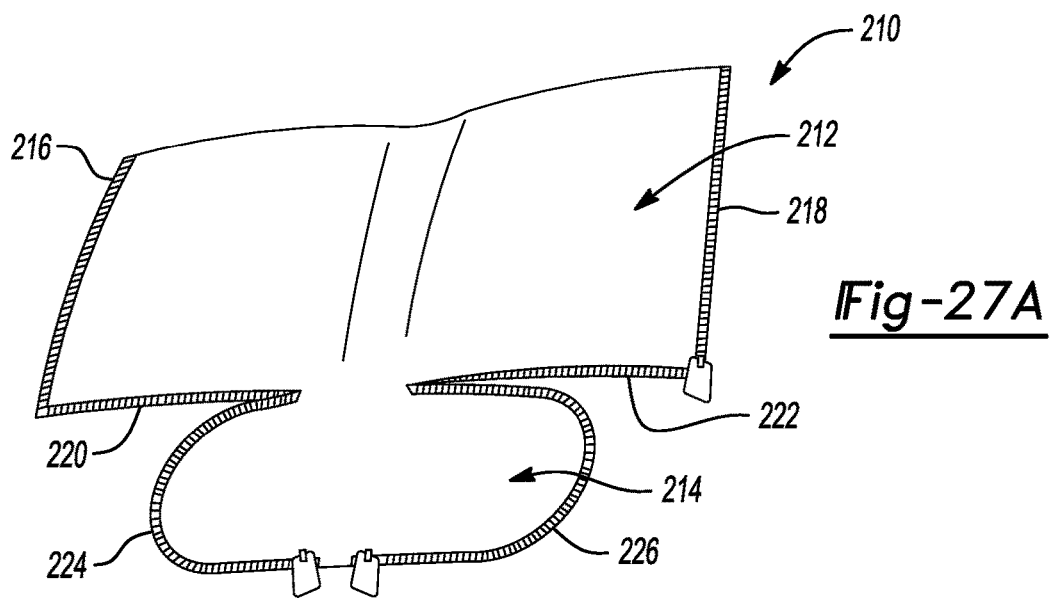
FIGS. 27A and 27B are perspective views of an example panel assembly according to the disclosure including rectangular and non-rectangular panels that are releasably attachable to one another.
Figure 27B:
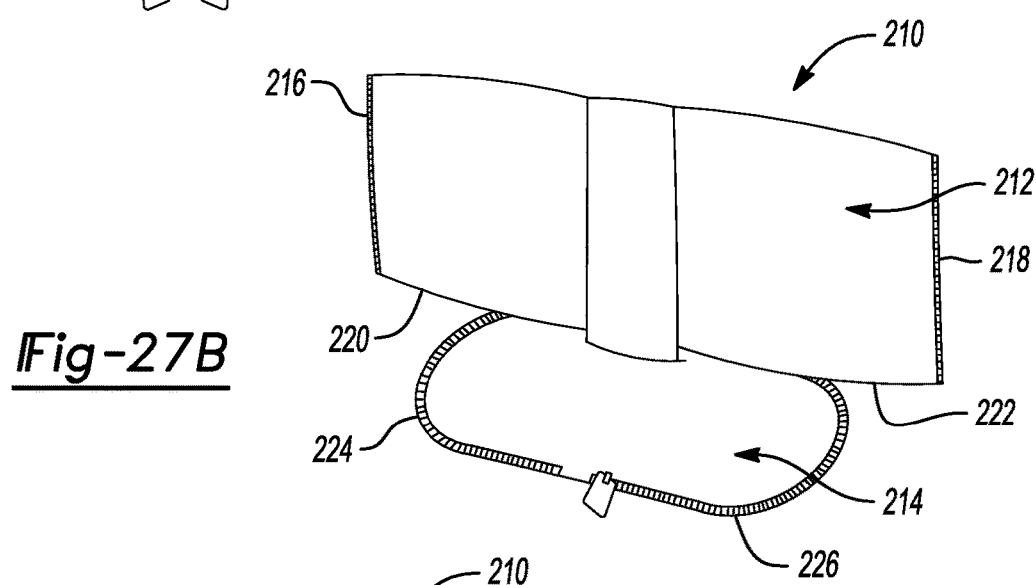
Figure 27C:
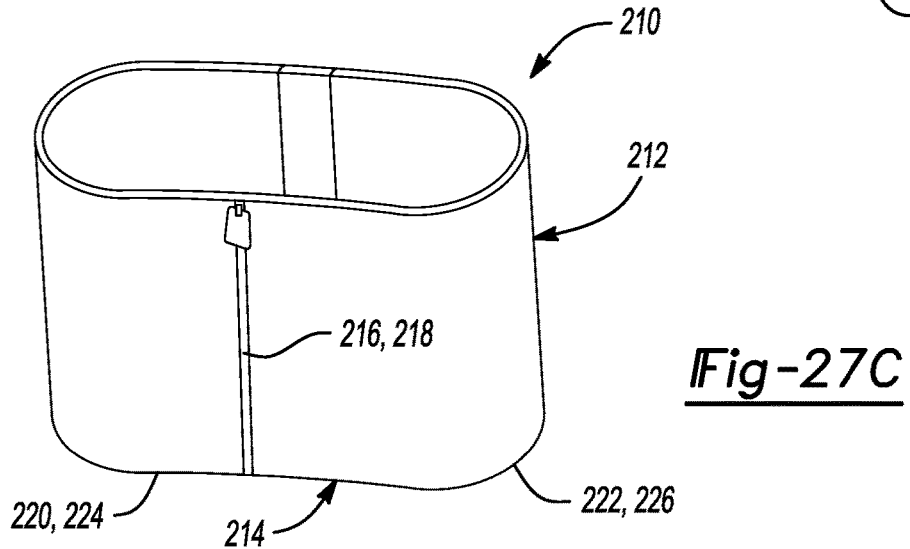
FIG. 27C is a perspective view of the panel assembly of FIGS. 27A and 27B with the panels releasably attached to one another.

Referring now to FIGS. 27A-27C, an inflatable panel assembly 210 is shown that includes a rectangular inflatable panel 212 and a non-rectangular inflatable panel 214. In the example shown, the non-rectangular inflatable panel 214 has an oval shape. Each of the rectangular and non-rectangular panels 210 and 212 may have the single bladder layer configuration shown in FIGS. 8A and 8B or the double bladder layer configuration shown in FIGS. 9A and 9B. In addition, the rectangular and non-rectangular panels 210 and 212 are releasably attachable to one another.

The rectangular inflatable panel 212 includes a first zipper half 216 disposed along a first edge thereof, a second zipper half 218 disposed along a second edge thereof, a third zipper half 220 disposed along a third edge thereof, and a fourth zipper half 222 disposed along a fourth edge thereof. The first and second zipper halves 216 and 218 form a first zipper. The non-rectangular inflatable panel 214 has a fifth zipper half 224 disposed along a first portion of its outer perimeter and a sixth zipper half 226 disposed along a second portion of its outer perimeter. The third and fifth zipper halves 220 and 224 form a second zipper. The fourth and sixth zipper halves 222 and 226 form a third zipper.

The rectangular and non-rectangular inflatable panels 212 and 214 can be attached to or detached from one another by zipping or unzipping the second and third zippers. The first and second edges of the rectangular inflatable panel 212 may be attached to or detached from one another by zipping or unzipping the first zipper. In FIG. 27A, the rectangular and non-rectangular inflatable panels 212 and 214 are laying flat. In FIG. 27B, the rectangular inflatable panel 212 is perpendicular to the non-rectangular inflatable panel 214 with the first, second, and third zippers unzipped. In FIG. 27C, the first, second, and third zippers are zipped, and the inflatable panel assembly 194 has a rectangular cube shape with rounded corners.

Figure 28A:
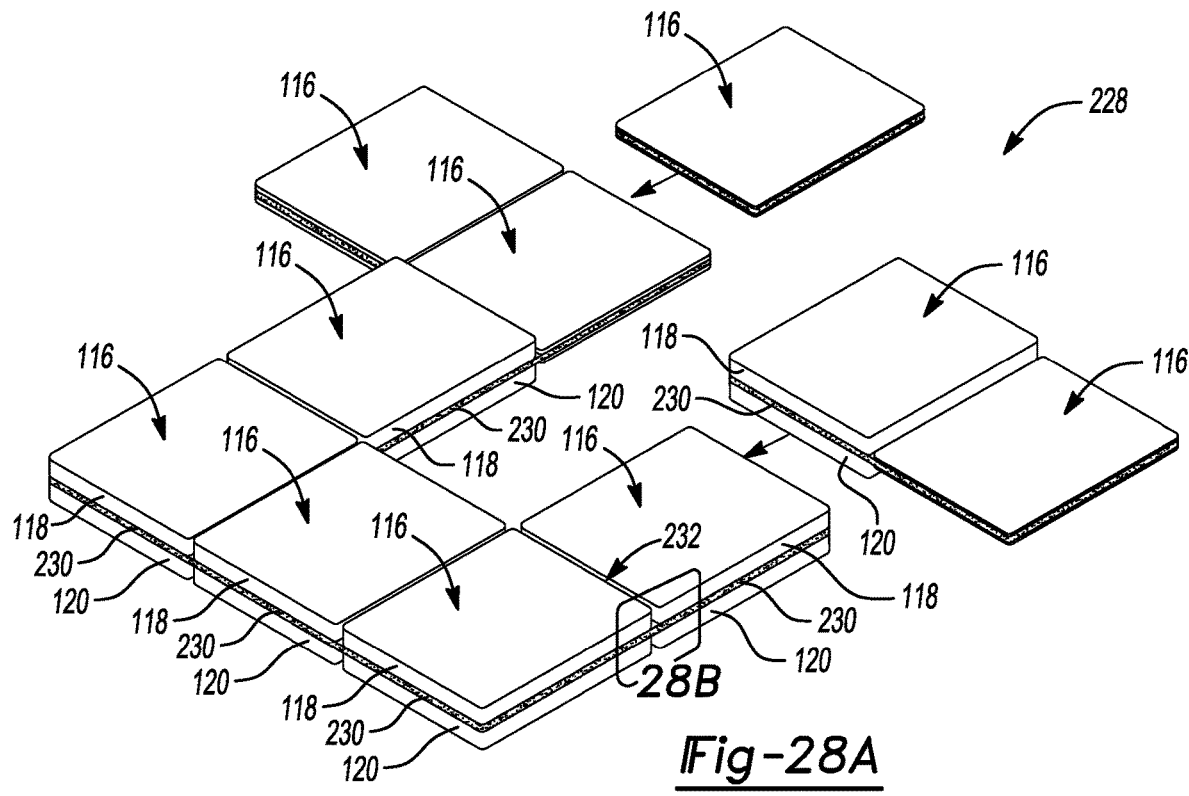
FIG. 28A is a perspective view of an example panel assembly according to the present disclosure including rectangular panels that are releasably attachable to one another.
Figure 28B:
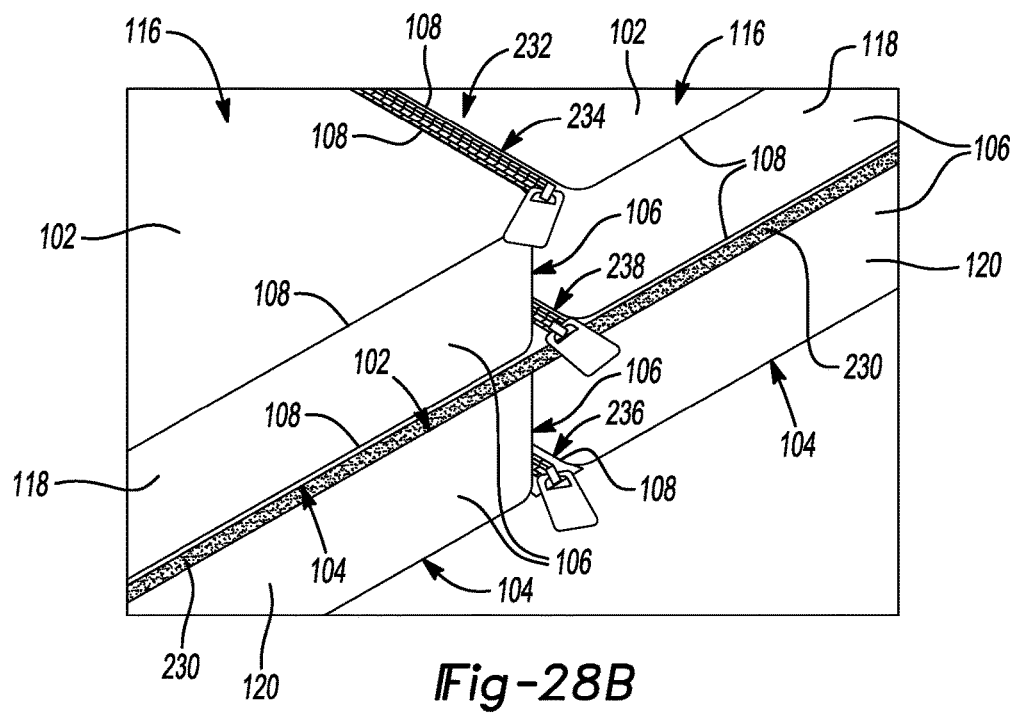
FIG. 28B is a perspective view of a portion of the panel assembly of FIG. 28A within a rectangle 28B shown in FIG. 28A.

Referring now to FIGS. 28A and 28B, an inflatable panel assembly 228 is similar or identical to the inflatable panel assembly 128 of FIGS. 10-14 except that the inflatable panels 116 in the inflatable panel assembly 228 are releasably attachable to one another. In addition, the membrane 130 is replaced with a plurality of membranes 230, and each membrane 230 has the same width and length as the respective inflatable panel 116. Releasable attachment mechanisms 232 are fixed to one or more (e.g., all) sides of each inflatable panel 116 and each membrane 130.

The releasable attachment mechanisms 232 include a first zipper 234, a second zipper 236, and a third zipper 238. The first zipper 234 releasably attaches the first bladders 118 of adjacent inflatable panels 116 to one another. The second zipper 236 releasably attaches the second bladders 120 of adjacent inflatable panels 116 to one another. The third zipper 238 releasably attaches the membranes 230 of adjacent inflatable panels 116 to one another.

The first zipper 234 may attach one of the perimeter edges 108 of the top wall 102 of the first bladder 118 of one of the inflatable panels 116 to one of the perimeter edges 108 of the top wall 102 of the first bladder 118 of an adjacent inflatable panel 116. Alternatively, the first zipper 234 may attach one of the sidewalls 106 of the first bladder 118 of the one inflatable panel 116 to one of the sidewalls 106 of the first bladder 118 of the adjacent inflatable panel 116. The second zipper 236 may attach one of the perimeter edges 108 of the bottom wall 104 of the second bladder 120 of one of the inflatable panels 116 to one of the perimeter edges 108 of the bottom wall 104 of the second bladder 120 of an adjacent inflatable panel 116. Alternatively, the second zipper 236 may attach one of the sidewalls 106 of the second bladder 120 of the one inflatable panel 116 to one of the sidewalls 106 of the second bladder 120 of the adjacent inflatable panel 116.

Figure 29:
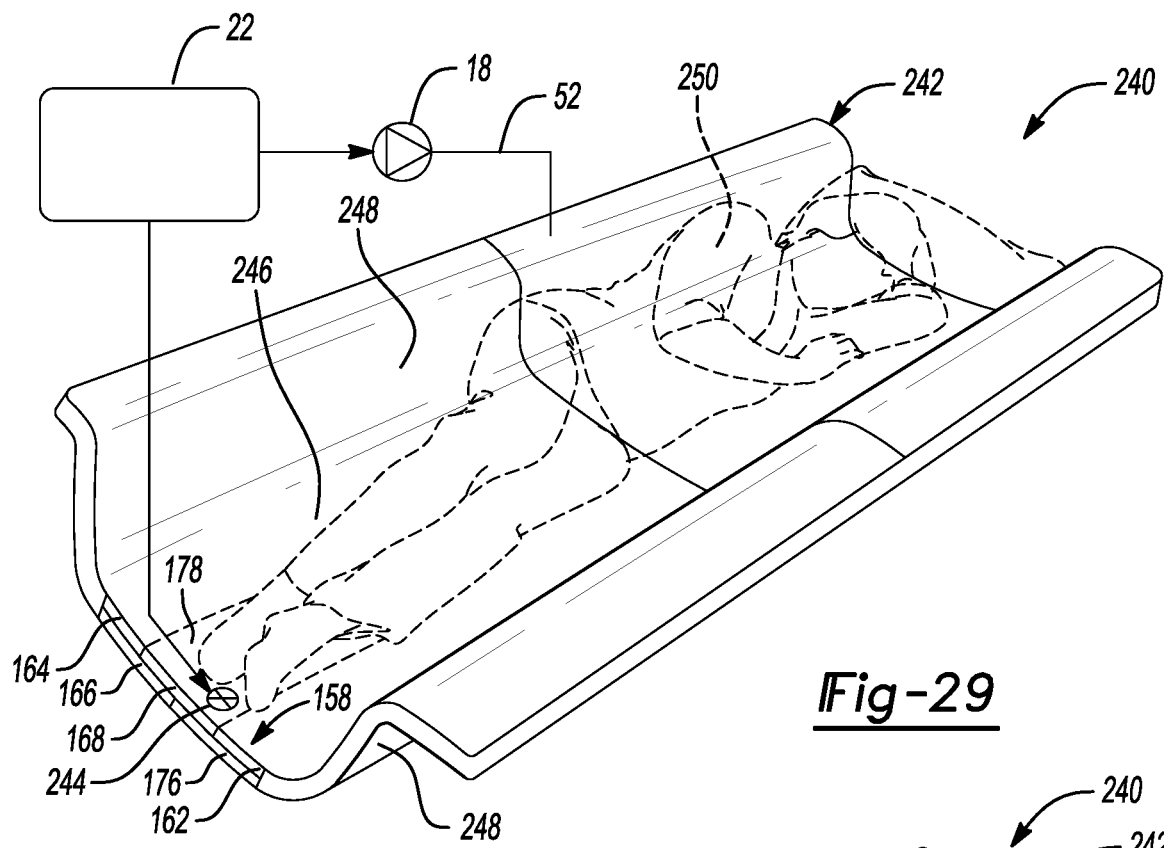
FIGS. 29 and 30 are perspective views of another example of a reconfigurable seating and cargo system according to the present disclosure.
Figure 30:
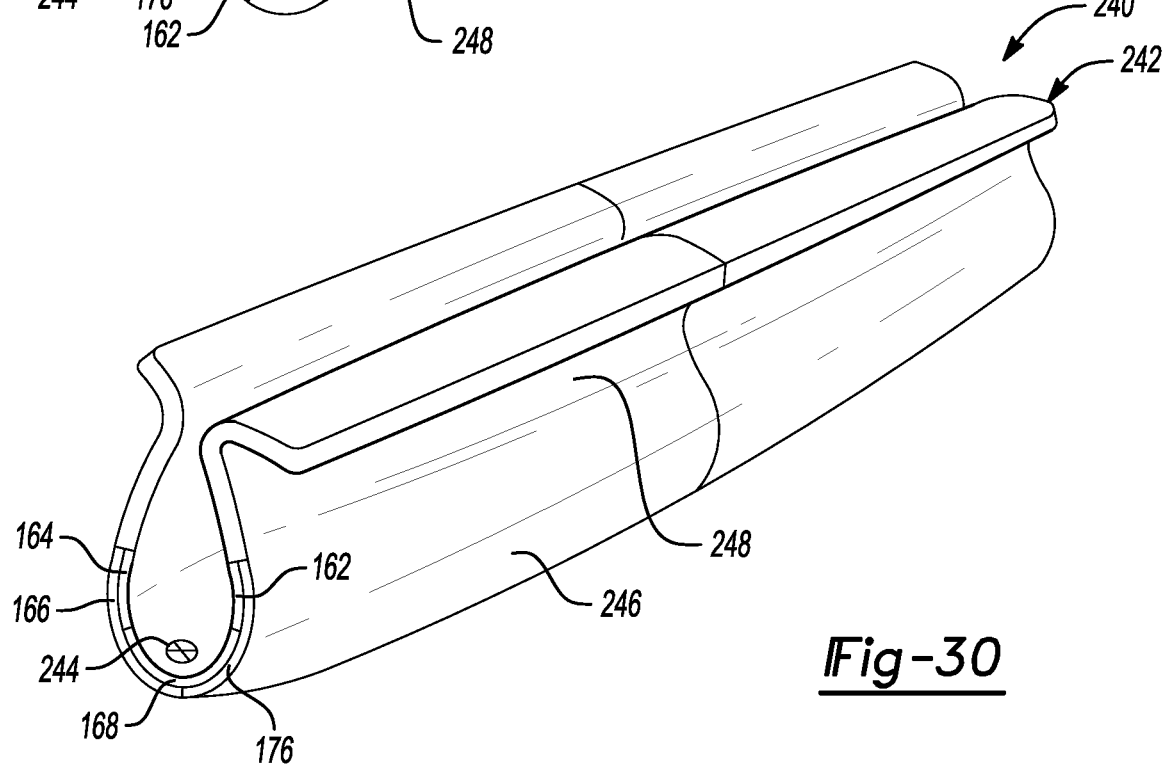

Referring now to FIGS. 29 and 30, a reconfigurable seating and cargo system 240 includes an inflatable panel assembly 242 and a valve 244, as well the pump 18, the panel control module 22, and the gas supply line 52 of FIG. 1. The inflatable panel assembly 242 can be reconfigured rapidly in response to a dynamic event or extreme conditions. Support attachments can be released or relocated, panels can be inflated or deflated, and/or panel interconnections can be severed or released to allow or force the inflatable panel assembly 242 to rapidly reposition into a different configuration. One or more of these measures may be taken to restrict or allow different motions or deformations of the inflatable panel assembly 242.

In the example shown, the inflatable panel assembly 242 can be rapidly reconfigured from an open bed configuration shown in FIG. 29 to a closed bed configuration shown in FIG. 30. The inflatable panel assembly 242 includes a bottom wall 246 and sidewalls 248 extending upward from opposite sides of the bottom wall 246. The bottom wall 246 includes the inflatable panel assembly 158 of FIG. 23-25. The first, second, third, fourth, and fifth bladders 164, 166, 168, 174, and 176 of the inflatable panel assembly 158 extend along the entire length of the bottom wall 246. The valve 244 extends through the top wall 178 of the third bladder 168.

In FIG. 29, the inflatable panel assembly 242 forms at least a portion of a seat cushion configured to support an occupant 250 of the vehicle. When the vehicle is about to impact an object, the panel control module 22 opens the valve 244 to deflate the third bladder 168 such that the first and second panels 160 and 162 fold toward one another and around the occupant 250 under the weight thereof. In turn, the inflatable panel assembly 242 forms an envelope around the occupant 250 that protects the occupant 250 as shown in FIG. 30. The weight of the occupant 250 may be represented by the downward force 192 shown in FIG. 24.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An inflatable system comprising:
a first bladder configured to contain gas, the first bladder including a top wall, a bottom wall opposite of the top wall, a sidewall extending between and connected to perimeter edges of the top and bottom walls, and a plurality of tethers extending between and connected to interior surfaces of the top and bottom walls; and
a second bladder configured to contain gas, the second bladder including a top wall, a bottom wall opposite of its top wall, a sidewall extending between and connected to perimeter edges of its top and bottom walls, and a plurality of tethers extending between and connected to interior surfaces of its top and bottom walls, wherein the bottom wall of the first bladder is secured to the top wall of the second bladder;
a membrane disposed between the first and second bladders, wherein the bottom wall of the first bladder is one of attached to and formed by a top surface of the membrane and the top wall of the second bladder is one of attached to and formed by a bottom surface of the membrane such that the bottom wall of the first bladder is secured to the top wall of the second bladder through the membrane;
a third bladder configured to contain gas, the third bladder including a top wall, a bottom wall opposite of its top wall, a sidewall extending between and connected to perimeter edges of its top and bottom walls, and a plurality of tethers extending between and connected to interior surfaces of its top and bottom walls;
a fourth bladder configured to contain gas, the fourth bladder including a top wall, a bottom wall opposite of its top wall, a sidewall extending between and connected to perimeter edges of its top and bottom walls, and a plurality of tethers extending between and connected to interior surfaces of its top and bottom walls, wherein:
the bottom wall of the third bladder is one of attached to and formed by the top surface of the membrane;
the top wall of the fourth bladder is one of attached to and formed by the bottom surface of the membrane;
when the first and third bladders are inflated, the sidewall of the third bladder abuts the sidewall of the first bladder at a first location along a length of the membrane; and
when the second and fourth bladders are inflated, the sidewall of the fourth bladder abuts the sidewall of the second bladder at a second location along the length of the membrane; and
wherein each of the first, second, third and fourth bladders are inflatable and deflatable independent of one another and the inflatable system is configurable in a first orientation with the third bladder deflated and the fourth bladder inflated and the top wall of the third bladder being at an angle of less than 180 degrees to the top wall of the first bladder and is configurable in a second orientation different that the first orientation with the third bladder inflated and the fourth bladder deflated and the bottom wall of the fourth bladder being at an angle of less than 180 degrees to the bottom wall of the second bladder.

2. The inflatable system of claim 1 wherein the inflatable system is reconfigurable by at least one of inflating the third bladder, deflating the third bladder, and adjusting the tension of the tethers in at least one of the first, second, and third bladders.

3. The inflatable system of claim 1 wherein:
the second location is the same as the first location; and
an interface between the abutting sidewalls of the first and third bladders is disposed above an interface between the abutting sidewalls of the second and fourth bladders.

4. The inflatable system of claim 1 wherein:
the second location is different than the first location; and
the third bladder is disposed above an interface between the abutting sidewalls of the second and fourth bladders.

5. The inflatable system of claim 4 wherein the first, second, third, and fourth bladders are configured to form at least a portion of a vehicle seat cushion, the inflatable system further comprising a panel control module configured to deflate the third bladder such that the second and fourth bladders fold toward one another and around an occupant on the vehicle seat cushion under a weight of the occupant.

6. An inflatable system comprising:
a first bladder configured to contain gas, the first bladder including a top wall, a bottom wall opposite of the top wall, a sidewall extending between and connected to perimeter edges of the top and bottom walls, and a plurality of tethers extending between and connected to interior surfaces of the top and bottom walls;
a second bladder configured to contain gas, the second bladder including a top wall, a bottom wall opposite of its top wall, a sidewall extending between and connected to perimeter edges of its top and bottom walls, and a plurality of tethers extending between and connected to interior surfaces of its top and bottom walls, wherein the second bladder is releasably attached to the first bladder by a first zipper;
wherein when the first and second bladders are inflated, the sidewall of the second bladder abuts the sidewall of the first bladder;
the first zipper releasably attaches the one sidewall of the second bladder to the one sidewall of the first bladder;
a third bladder configured to contain gas, the third bladder including a top wall, a bottom wall opposite of its top wall, a sidewall extending between and connected to perimeter edges of its top and bottom walls, and a plurality of tethers extending between and connected to interior surfaces of its top and bottom walls,
a fourth bladder configured to contain gas, the fourth bladder including a top wall, a bottom wall opposite of its top wall, a sidewall extending between and connected to perimeter edges of its top and bottom walls, and a plurality of tethers extending between and connected to interior surfaces of its top and bottom walls, wherein:
the bottom wall of the first bladder is secured to the top wall of the third bladder;
the bottom wall of the second bladder is secured to the top wall of the fourth bladder;
when the third and fourth bladders are inflated, the sidewall of the fourth bladder abuts the sidewall of the third bladder; and
a second zipper that releasably attaches the one sidewall of the fourth bladder to the one sidewall of the third bladder.

7. The inflatable system of claim 6 further comprising:
a first membrane disposed between the first and third bladders, wherein the bottom wall of the first bladder is one of attached to and formed by a top surface of the first membrane and the top wall of the third bladder is one of attached to and formed by a bottom surface of the first membrane; and
a second membrane disposed between the second and fourth bladders, wherein:
the bottom wall of the second bladder is one of attached to and formed by a top surface of the second membrane and the top wall of the fourth bladder is one of attached to and formed by a bottom surface of the second membrane; and
a third zipper that releasably attaches the second membrane to the first membrane.

8. A vehicle seating and cargo system comprising:
a vehicle passenger cabin;
a seat secured within the vehicle passenger cabin and including:
a first bladder configured to contain gas, the first bladder including a top wall, a bottom wall opposite of the top wall, a sidewall extending between and connected to perimeter edges of the top and bottom walls, and a plurality of tethers extending between and connected to interior surfaces of the top and bottom walls; and
a second bladder configured to contain gas, the second bladder including a top wall, a bottom wall opposite of its top wall, a sidewall extending between and connected to perimeter edges of its top and bottom walls, and a plurality of tethers extending between and connected to interior surfaces of its top and bottom walls, wherein at least one of:
the bottom wall of the first bladder is secured to the top wall of the second bladder; and
the second bladder is releasably attached to the first bladder;
a third bladder configured to contain gas, the third bladder including a top wall, a bottom wall opposite of its top wall, a sidewall extending between and connected to perimeter edges of its top and bottom walls, and a plurality of tethers extending between and connected to interior surfaces of its top and bottom walls;
a fourth bladder configured to contain gas, the fourth bladder including a top wall, a bottom wall opposite of its top wall, a sidewall extending between and connected to perimeter edges of its top and bottom walls, and a plurality of tethers extending between and connected to interior surfaces of its top and bottom walls; and
at least one membrane disposed between the first and second bladders and between the third and fourth bladders, wherein:
the bottom walls of the first and third bladders are secured to a top surface of the at least one membrane;
the top walls of the second and fourth bladders are secured to a bottom surface of the at least one membrane;
the first bladder is aligned with the second bladder along a length of the at least one membrane; and
the third bladder is aligned with the fourth bladder along the length of the at least one membrane, wherein each of the first, second, third and fourth bladders are inflatable and deflatable independent of one another and configurable in a first orientation with the third bladder deflated and the fourth bladder inflated and the top wall of the third bladder being at an angle of less than 180 degrees to the top wall of the first bladder and is configurable in a second orientation different that the first orientation with the third bladder inflated and the fourth bladder deflated and the bottom wall of the fourth bladder being at an angle of less than 180 degrees to the bottom wall of the second bladder.

9. The vehicle seating and cargo system of claim 8 wherein the at least one membrane includes a first membrane disposed between the first and second bladders and a second membrane disposed between the third and fourth bladders, the vehicle seating and cargo system further comprising:
a first zipper releasably attaching the third bladder to the first bladder;
a second zipper releasably attaching the fourth bladder to the second bladder; and
a third zipper releasably attaching the second membrane to the first membrane.

* * * * *